US007702753B2

(12) United States Patent
Simongini et al.

(10) Patent No.: US 7,702,753 B2
(45) Date of Patent: *Apr. 20, 2010

(54) UNIFIED DIRECTORY AND PRESENCE SYSTEM FOR UNIVERSAL ACCESS TO TELECOMMUNICATIONS SERVICES

(75) Inventors: Alberto Simongini, Rome (IT); Aurelio Nocerino, Rome (IT); Alessandro Orsano, Pomezla Rorre (IT); Francesco Perta, Rome (IT)

(73) Assignee: Accenture Global Services GmbH, Schaffhausen (CH)

( * ) Notice: Subject to any disclaimer, the term of this patent is extended or adjusted under 35 U.S.C. 154(b) by 944 days.

This patent is subject to a terminal disclaimer.

(21) Appl. No.: 11/313,463

(22) Filed: Dec. 13, 2005

(65) Prior Publication Data
US 2007/0123253 A1 May 31, 2007

(30) Foreign Application Priority Data
Nov. 21, 2005 (EP) .................................. 05425821
Nov. 21, 2005 (IT) ........................... BS2005A0143

(51) Int. Cl.
G06F 15/16 (2006.01)
H04M 3/00 (2006.01)
(52) U.S. Cl. ........................ 709/219; 709/204; 709/227; 709/246; 455/418; 455/419
(58) Field of Classification Search ................. 709/204, 709/207
See application file for complete search history.

(56) References Cited
U.S. PATENT DOCUMENTS
5,265,065 A 11/1993 Turtle
(Continued)

FOREIGN PATENT DOCUMENTS
EP 0 950 964 A2 10/1999
(Continued)

OTHER PUBLICATIONS

Nokia "Parameters in Subscriber Certificate and Subscriber Profile Supporting Operator Control and Service Differentiation", 4pp., 3GPP TSG SA WG 3 Security, Feb. 25-28, 2003, Sophia Antipolis, France.
Dr. Bert Dempsey and Dr. Matthew Lucas, "IPDR Update: Standards Effort Moves From Usage to Provisioning ", pp. 44-48, TeIOSSource Magazine, Apr. 2000.
Sun Microsystems, Chapter 8, Authentication Options, Sun Java System Access Manager 6 2005Q1 Adminstration Guide, Sun Microsystems, pp. 1-25, Mar. 2005.
(Continued)

Primary Examiner—Joseph E Avellino
Assistant Examiner—Harunur Rashid
(74) Attorney, Agent, or Firm—Brinks Hofer Gilson & Lione

(57) ABSTRACT

A subscriber profile access management system for a telecommunications service provider or telecommunications operator provides technical solutions to providing a single point of access to telecommunications subscriber profile information. As the products and services offered by the service provider grow, and given the many different access mechanisms through which a subscriber connects to services, the single point of access eliminates the inefficient proliferation of custom interfaces between the many support systems and applications which need access to subscriber profile information. The single point of access provides a universal and personalized access to telecommunications services. Access may be made to the subscriber profile regardless of the particular type of access mechanism (e.g., WiFi, or DSL access), while the personalized access allows services to be customized based upon static and dynamically maintained information in the subscriber profile.

28 Claims, 14 Drawing Sheets

U.S. PATENT DOCUMENTS

| | | | |
|---|---|---|---|
| 5,535,325 | A | 7/1996 | Cattell et al. |
| 5,644,740 | A | 7/1997 | Kiuchi et al. |
| 5,953,723 | A | 9/1999 | Linoff et al. |
| 5,960,430 | A | 9/1999 | Haimowitz et al. |
| 6,076,093 | A | 6/2000 | Pickering |
| 6,233,571 | B1 | 5/2001 | Egger et al. |
| 6,256,032 | B1 | 7/2001 | Hugh |
| 6,263,370 | B1 | 7/2001 | Kirchner et al. |
| 6,397,231 | B1 | 5/2002 | Salisbury et al. |
| 6,434,558 | B1 | 8/2002 | MacLeod et al. |
| 6,453,356 | B1 | 9/2002 | Sheard et al. |
| 6,460,034 | B1 | 10/2002 | Wical |
| 6,714,987 | B1 * | 3/2004 | Amin et al. ............. 709/249 |
| 6,775,262 | B1 | 8/2004 | Skog |
| 6,807,181 | B1 | 10/2004 | Weschler |
| 6,910,074 | B1 * | 6/2005 | Amin et al. ............. 709/227 |
| 6,985,569 | B2 | 1/2006 | Baker |
| 7,000,032 | B2 | 2/2006 | Kloba et al. |
| 7,047,236 | B2 | 5/2006 | Conroy et al. |
| 7,103,165 | B2 * | 9/2006 | Baniak et al. ......... 379/201.02 |
| 7,140,025 | B1 | 11/2006 | Dillow et al. |
| 7,310,532 | B2 * | 12/2007 | Knauerhase et al. ..... 455/456.1 |
| 7,506,040 | B1 | 3/2009 | Rabe et al. |
| 2002/0035617 | A1 * | 3/2002 | Lynch et al. ............. 709/219 |
| 2002/0046296 | A1 | 4/2002 | Kloba et al. |
| 2002/0065856 | A1 | 5/2002 | Kisiel |
| 2003/0005034 | A1 | 1/2003 | Amin |
| 2003/0065777 | A1 | 4/2003 | Mattila et al. |
| 2003/0172272 | A1 | 9/2003 | Ehlers et al. |
| 2004/0015366 | A1 * | 1/2004 | Wiseman et al. ............. 705/1 |
| 2004/0015486 | A1 | 1/2004 | Liang et al. |
| 2004/0090472 | A1 | 5/2004 | Risch et al. |
| 2004/0111506 | A1 | 6/2004 | Kundu et al. |
| 2004/0133486 | A1 | 7/2004 | Markki et al. |
| 2004/0133627 | A1 | 7/2004 | Kalyanaraman et al. |
| 2004/0139166 | A1 | 7/2004 | Collison |
| 2004/0153404 | A1 | 8/2004 | Rischmueller et al. |
| 2004/0186824 | A1 | 9/2004 | Delic et al. |
| 2004/0186842 | A1 | 9/2004 | Wesemann |
| 2004/0249910 | A1 | 12/2004 | Jerbi et al. |
| 2005/0037752 | A1 * | 2/2005 | Kwan et al. ............. 455/432.3 |
| 2005/0038869 | A1 | 2/2005 | Zimler et al. |
| 2005/0043940 | A1 | 2/2005 | Elder |
| 2005/0060643 | A1 | 3/2005 | Glass et al. |
| 2005/0073999 | A1 | 4/2005 | Koch |
| 2005/0091370 | A1 | 4/2005 | Wietfeld |
| 2005/0102675 | A1 | 5/2005 | Parkyn |
| 2005/0114367 | A1 | 5/2005 | Serebrennikov |
| 2005/0149724 | A1 | 7/2005 | Graff |
| 2005/0160135 | A1 | 7/2005 | Yokoro |
| 2005/0165930 | A1 | 7/2005 | Whitman |
| 2005/0175021 | A1 | 8/2005 | Ozugur et al. |
| 2005/0223064 | A1 | 10/2005 | Salerno et al. |
| 2006/0047709 | A1 | 3/2006 | Belin et al. |
| 2007/0242819 | A1 | 10/2007 | Bozionek et al. |
| 2007/0274291 | A1 | 11/2007 | Diomelli |
| 2008/0117917 | A1 * | 5/2008 | Balay et al. ............ 370/395.21 |

FOREIGN PATENT DOCUMENTS

| | | |
|---|---|---|
| EP | 0 902 380 A3 | 11/1999 |
| EP | 0 980 175 A2 | 6/2000 |
| EP | 1 052 841 A2 | 11/2000 |
| EP | 1 418 743 A1 | 5/2004 |
| JP | 2005-202631 | 7/2005 |
| WO | WO 03/025809 A2 | 3/2003 |
| WO | WO 03/069506 A3 | 6/2004 |

OTHER PUBLICATIONS

Opencon, "White Paper on Billing for the New Public Network", pp. 1-5, OpenCon Systems, Inc., www.opencon.com, 2000.

The Parlay Group, Inc., The Parlay Goup: Web Services Working Group, "Parlay Web Services Application Deployment Infrastructure", pp. 1-21, Version 1.0, Oct. 31, 2002.

Michel L.F. Grech et al., "Delivering Searmless Services in Open Networks Using Intelligent Service Mediation", pp. 186-202, Bell Labs Technical Journal, Jul.-Sep. 2000.

Indian Examination Report, dated Sep. 29, 2008, Indian Patent App. No. 1722/MUM/2006.

EPO Examination Report, dated May 19, 2006, EP Pat. No. 0542821.5.

EPO Examination Report, dated May 10, 2006, EP Pat. No. 0542824.9.

Anokhin, P. and Motro, A., "Fusionplex: Resolution of Data Inconsistencies in the Integration of Heterogeneous Information Sources," Jan. 20, 2004, pp. 1-31; XP002392285.

Berendt, B., Hotho, A. Mladenic, D., van Someren, M., Spillopoulou, M., & Stumme, G. (2004). A Roadmap for Web Mining: From Web to Semantic Web. In Web Mining: From Web to Semantic Web url—citeseer.ist.psu.edu/762860.html.

Feldman, R., Aumann, Y., Finkelstein-Landau, M., Hurvitz, E., Regev, Y., and Yaroshevich, A., "A Comparative Study of Information Extraction Strategies," 2002, pp. 1-12; XP-002378981.

Gertz, M., "Managing Data Quality and Integrity in Federated Databases," 2nd Annual IPIP TC-11 WG11.5 Working Conference on Integrity and Internal Control in Information Systems, Nov. 1998, pp. 1-19; © IFIP 1996; Published by Chapman & Hall; XP002392339.

Green, S.J., "Building Hypertext Links by Computing Semantic Similarity" IEEE Transactions on Knowledge and Data Engineering, vol. 11, No. 5, Sep. 1999, pp. 713-730; XP-002317545.

Jennings, M., "Enterprise Architecture View: Fingerprinting Data Warehouse Data," DMReview, Jan. 2003, pp. 1-4; XP-002379520.

Kellogg, R.B., Subhas, M., "Text to hypertext: Can Clustering Solve the Problem in Digital Libraries?" Proceedings of 1st ACM International Conference on Digital Libraries, Mar. 20, 1996, pp. 144-150; © 1996 ACM 0-89791-830-4/96/03; XP-002317546.

Lamping, John, Rao, R., and Pirolli, P., "A Focus+Context Technique Based on Hyperbolic Geometry for Visualizing Large Hierarchies," to *Xerox Palo Alto Research Center*, printed Mar. 7, 2002; © ACM.

Liongosari, Edy, Dempski, K.; and Swaminathan, K.S., "In Search of a New Generation of Knowledge Management Applications," in *ACM Siggroup Bulletin*, pp. 1-4, (Jul. 1999).

Naumann, F., "From Databases to Information Systems Information Quality Makes the Difference," Proceedings of the International Conference on Information Quality, 2001, pp. 1-17; XP002392340.

Ponniah, P., "Data Warehousing Fundamentals: A Comprehensive Guide for IT Professionals," 2001, © 2001 John Wiley & Sons, Inc., pp. 257-289; ISBN 0-471-41254-6.

Rennison, Earl, "Galaxy of News: An Approach to Visualizing and Understanding Expansive News Landscapes," in *UIST '94*, pp. 3-12, Nov. 2-4, 1994; © 1994 ACM 0-89791-657-3/94/0011.

United States Patent and Trademark Office Action mailed Oct. 10, 2008 for co-pending U.S. Appl. No. 11/313,496.

Notification of Reason for Rejection dated Sep. 11, 2008 for co-pending Japanese Patent Application No. 2006-319265.

Alani, H., "TGVizTab: An Ontology Visualisation Extension for Protégé," Proceedings of Knowledge Capture, Workshop on Visualization Information in Knowledge Engineering, Sanibel Island, FL, 2003, pp. 1-6.

Andrews, Keith, Ph.D., "Techniques from the field of Information Visualisation and their Potential Application to the AURIS Project," *Information Visualisation for AURIS*, Aug. 16, 2000, pp. i, ii and 1-19; © Keith Andrews.

Angeles, Pilar and MacKinnon, L.M., "Detection and Resolution of Data Inconsistencies, and Data Integration using Data Quality Criteria," QUATIC Proceeeings 2004, pp. 1-7; XP002392215.

Anonymous, "3GPP: Technical Specification Group Services and System Aspects, Presence Service, Architecture and Functional Description," 3GPP TS 23.141 V6.0.0, Oct. 2002, pp. 1-31.

Canadian Patent Office dated Jun. 30, 2009 for co-pending Canadian Patent Application No. 2,567,906.

Communication for EP 05 425 824.9 dated Apr. 28, 2006.

Dr. Bert Dempsey and Dr. Matthew Lucas, "IPDR Update: Standards Effort Moves From Usage to Provisioning", pp. 44-48, TelOSSource Magazine, Apr. 2000.

Droms, R., "RFC 1541 Dynamic Host Configuration Protocol," Internet, Oct. 1993, available from http://www.ietf.org/rfc1541.txt, 40 pages.

European Patent Office Search Report dated Nov. 23, 2007 for co-pending European Patent Office Application No. 05425821.5.
European Patent Office Action with Search Report dated Jan. 2, 2006 for co-pending European Patent Office Application No. 05425765.
European Patent Office Action with Search Report dated Nov. 10, 2005 for co-pending European Patent Office Application No. 05425612.
European Patent Office Action with Search Report dated Feb. 14, 2006 for co-pending European Patent Office Application No. 05425656.
European Patent Office Action with Search Report dated Mar. 14, 2006 for co-pending European Patent Office Application No. 05425657.
Fluit, C. et al., "Towards the Semantic Web: Ontology-driven Knowledge Management," 2003, John Wiley & Sons, Ltd., pp. 145-159.
Hammond, B., Sheth, A., Kochut, K., "Semantic Enhancement Engine: A Modular Document Enhancement Platform for Semantic Applications Over Heterogeneous Content," to appear in *Real World Semantic Web Applications*, 2002, pp. 1-22; to appear in Real World Semantic Web Applications, IOS Press, 2002; XP-002379024.
J. Reilly, et al., eds., OSS Through JAVA Initiative, Core Business Entities Concepts and Principles, Feb. 2006.
J. Strassner, et al., TMF White Paper on NGOSS and MDA, Version 1.0, Nov. 2003.
Japanese Official Action dispatched Sep. 16, 2008 for JP 2006-319265 (with English translation).
Livingston et al., Remote Authentication Dial in User Service (RADIUS); IETF Standard-Working-Draft, Internet Engineering Task Force, IETF, Ch. Vol. Radius, No. 5, Feb. 2000.
Michel L.F. Grech et al., "Delivering Searmless Services in Open Networks Using Intelligent Service Mediation", pp. 186-202, Bell Labs Technical Journal, Jul.-Sep. 2000.
Nokia "Parameters in Subscriber Certificate and Subscriber Profile Supporting Operator Control and Service Differentiation", 4pp., 3GPP TSG SA WG 3 Security, Feb. 25-28, 2003, Sophia Antipolis, France.
Office Action, mailed Apr. 2, 2009, for commonly owned U.S. Appl. No. 11/314,576.
Office Action, mailed Apr. 28, 2009, for commonly owned U.S. Appl. No. 11/400,249.
Office Action, mailed Jun. 2, 2009, for commonly owned U.S. Appl. No. 11/313,441.
Office Action, mailed Mar. 24, 2008, for commonly owned U.S. Appl. No. 11/314,577.
Office Action, mailed Oct. 10, 2008, for commonly owned U.S. Appl. No. 11/313,496.
Office Action, mailed Sep. 10, 2007, for commonly owned U.S. Appl. No. 11/127,776.
Opencon, "White Paper on Billing for the New Public Network", pp. 1-5, OpenCon Systems, Inc., www.opencon.com, 2000.
Quang Vinh Nguyen Mao Lin Huang, "A Combined Visualization of Multiple Relational Structures in Shared Collaborative Workspaces," Multimedia Software Engineering, 2004 Proceedings. IEEE Sixth International Symposium on Miami, FL, Dec. 13, 2004, Piscataway, NJ, IEEE, Dec. 13, 2004, pp. 388-395.
Seligman, L. And Rosenthal, A., "XML's Impact on Databases and Data Sharing," Computer, IEEE Service Center, Los Alamitos, CA, vol. 34, No. 6, Jun. 2001, pp. 59-67; © 2001 IEEE; XP-001103951.
Shared Information/Data (SID) Model, Concepts, Principles and Domains, TeleManagement Forum GB922, Dec. 2002.
Sheth A., et al., "Semantic Visualization: Interfaces for exploring and exploiting ontology, knowedgebase, heterogeneous content and complex relationships," Apr. 2004, pp. 1-9.
Sheth, A. Bertram, C., Avant, D., Hammond, B., Kochut, K., and Warke, Y., "Managing Semantic Content for the Web," IEEE Internet Computing, IEEE Service Center, New York, NY, Jul.-Aug. 2002, pp. 80-87; © 2002 IEEE.
Sheth, A. Bertram, C., Avant, D., Hammond, B., Kochut, K., and Warke, Y., "Semantic Content Management for Enterprises and the Web," Submitted for review for IEEE Internet Computing, 2002, pp. 1-19; XP-002379806.
Sheth, A., Aleman-Meza, B., Arpinar, I.B., Halaschek, C., Ramakrishnan, C., Clemens, B., Warke, Y., Avant, D., Arpinar, F.S.,
Anyanwu, K. And Kochut, K., "Semantic Association Identification and Knowledge Discovery for National Security Applications," © To authors or their employers until publication, Jan. 31, 2004, pp. 1-16; To appear in Special Issue of Journal of Database Management on Database Technology for Enhancing National Security, 16(1) 33-53, Jan.-Mar. 2005; XP-002378976.
Silver et al., "Unified Network Presence Management," White Paper Nortel Networks, 2000, pp. 1-6.
Storey et al., "Jambalaya: Interactive visualization to enhance ontology authoring and knowledge acquisition in Protégé," 2001.
Sullivan, Dan, "Document Warehousing and Text Mining: Chapter 8: Loading and Transforming Documents", 2001, John Wiley & Sons; XP-002317590.
Sun Microsystems, Chapter 8, Authentication Options, Sun Java System Access Manager 6 2005Q1 Administration Guide, Sun Microsystems, pp. 1-25, Mar. 2005.
The Parlay Group, Inc., The Parlay Goup: Web Services Working Group, "Parlay Web Services Application Deployment Infrastructure", pp. 1-21, Version 1.0, Oct. 31, 2002.
The transaction history of U.S. Appl. No. 11/313,441 shown in the attached Patent Application Retrieval file wrapper document list, printed Aug. 12, 2009.
The transaction history of U.S. Appl. No. 11/313,463 shown in the attached Patent Application Retrieval file wrapper document list, printed Aug. 12, 2009.
The transaction history of U.S. Appl. No. 11/313,496 shown in the attached Patent Application Retrieval file wrapper document list, printed Aug. 12, 2009.
The transaction history of U.S. Appl. No. 11/313,497 shown in the attached Patent Application Retrieval file wrapper document list, printed Aug. 12, 2009.
The transaction history of U.S. Appl. No. 11/314,576 shown in the attached Patent Application Retrieval file wrapper document list, printed Aug. 12, 2009.
The transaction history of U.S. Appl. No. 11/314,577 shown in the attached Patent Application Retrieval file wrapper document list, printed Aug. 12, 2009.
The transaction history of U.S. Appl. No. 11/400,249 shown in the attached Patent Application Retrieval file wrapper document list, printed Aug. 12, 2009.
Thuraisingham, B. And Hughes, E., "Data Quality: Developments and Directions," *Integrity, Internal Control and Security in Information Systems. Connecting Governance and Technology*. IPIP TC11/WG11.5 Fourth Working Conference on Integrity and International Control in Information Systems, Kluwer Academic Publishers, Norwell, MA, USA, 2002, pp. 97-102; XP008067100.
Office Action, mailed Nov. 13, 2009, for commonly owned U.S. Appl. No. 11/400,249.
Office Action, mailed Nov. 9, 2009, for commonly owned U.S. Appl. No. 11/313,497.
Office Action, mailed Dec. 18, 2009, for commonly owned U.S. Appl. No. 11/313,441.
Notice of Allowability, mailed Nov. 12, 2009, for commonly owned U.S. Appl. No. 11/314,576.
The prosecution history of commonly owned U.S. Appl. No. 11/399,780 shown in the attached Patent Application Retrieval file wrapper document list, printed Jan. 5, 2010.
Australian Official Report, mailed Dec. 17, 2007, for co-pending Australian Patent Application No. 2006236099.
Australian Official Report, mailed Dec. 12, 2007, for co-pending Australian Patent Application No. 2006236096.
Chinese Office Action, mailed Mar. 13, 2009, for co-pending Chinese Patent Application No. 200610149468.2.
English Translation of the Chinese Office Action, mailed Mar. 13, 2009, for co-pending Chinese Patent Application No. 200610149468.2.
European Patent Office Search Report dated May 19, 2006 for co-pending European Patent Office Application No. 05425821.5.
European Patent Office Search Report dated May 10, 2006 for co-pending European Patent Office Application No. 05425824.9.

* cited by examiner

| Published Connection Message | | | | | | 325 |
|---|---|---|---|---|---|---|
| msgType 802 | username 804 | server IP 806 | client IP 808 | accessServerIP 810 | | |
| accessServerID 812 | slot 814 | port 816 | interface 818 | vpi 820 | vci 822 | |

Figure 8

| Message Publisher Output Message | | 900 |
|---|---|---|
| code 902 | description 904 | |

Figure 9

UNIFIED DIRECTORY AND PRESENCE SYSTEM FOR UNIVERSAL ACCESS TO TELECOMMUNICATIONS SERVICES

BACKGROUND OF THE INVENTION

1. Priority Claim

This application claims the priority benefit of EPO Application No. 05425821.5 filed Nov. 21, 2005, and Italian Application No. BS2005A000143 filed Nov. 21, 2005, both of which are incorporated herein by reference in their entirety.

2. Technical Field

This invention relates to telecommunications service provider and telecommunication operator system architectures. In particular, this invention relates to maintaining and providing efficient access to both static and dynamic telecommunication subscriber profile information.

3. Related Art

Rapid advances in computer system and telecommunications technology have lead to a vast array of telecommunication services available to the consumer. Such telecommunications services include traditional telephone service, Internet service, cable television service, cellular phone service, messaging service, paging service, combined voice and data delivery service, and many other services. Furthermore, many services may be either wireless or wireline based.

Telecommunications subscribers access their services through a wide range of connections. The hardware underlying the connections implements circuit switched connections, packet switched connections, and other types of connections. In addition, a wide range of communication protocols and access technologies further govern the transfer of data on the connections. Asymmetric Digital Subscriber Line (ADSL), Multi-protocol Label Switching (MPLS), Virtual Private Networks (VPNs), and other technologies are several examples of a wide array of access technologies for telecommunications services.

Growing support of new and existing telecommunications services and the wide range of access mechanisms for those services have led to an extensive dispersal of subscriber profile information between many different telecommunication support systems which support the services and access mechanisms. The dispersal leads to the inefficient proliferation of custom interfaces between systems and applications which need to obtain profile information to authorize or authenticate access, determine which services are subscribed, determine how the subscriber connects to the services, and for many other reasons. Thus, in the past there was no sufficiently secure, flexible, and efficient mechanism which provided a single point of access to telecommunication subscriber profile information and which maintained the subscriber profile information.

A need has long existed for an enhanced system architecture for a telecommunications service provider or telecommunications operator which efficiently provides access to and maintains subscriber profile information.

SUMMARY

Creating an enhanced telecommunications service provider or telecommunication operator system architecture which provides and maintains subscriber profile information poses significant technical challenges. As one example, there is a technical challenge in defining and implementing an architecture which provides a single point of access to the subscriber profile information, and which eliminates inefficient dispersal of subscriber information among many different systems. Another technical challenge lies in providing a database data model architecture which efficiently flexibly supports real time and static presence information not only for subscribers, but also for the network services which subscribers use to connect to network resources and for the applications which subscribers use to, for example, communicate with other subscribers. Yet another technical challenge lies in providing a high performance data access layer which stores and updates subscriber profile information, and which responds to queries for subscriber profile information in a carrier grade environment where hundreds of thousands or millions of subscribers may generate an immense number (e.g., hundreds or thousands) of subscriber profile updates or queries per second.

One aspect of the invention is a subscriber profile access management system for a telecommunications service provider or telecommunication operator. Another aspect of the invention is a presence system for use in the subscriber profile access management system. Still another aspect of the invention is a unified directory system for use in the subscriber profile access management system. The presence system includes a network data gatherer which may establish a single point of access for authorizing client access to network resources, and which updates subscriber presence information in the unified directory.

The presence system also includes a message publisher in communication with the network data gatherer. The message publisher generates a published connection message from the subscriber connection message which the network data gatherer receives. A message queue manager queues the published connection message for delivery to a rules manager which subscribes to such messages. Thus, the rules manager receives the published connection message from the message queue manager.

The rules manager applies routing rules to the published connection message. The routing rules determine how to process the published connection message. In one implementation, the routing rules determine whether to forward the published connection message to a technical key management queue or to a presence management queue. The technical key management queue handles authentication of subscriber connection requests (e.g., RADIUS authentication or DHCP discover requests). The messages in the technical key management queue include technical key information which is matched against technical keys stored in the unified directory. When the subscriber is authenticated, the associated subscriber information is inserted into the unified directory system, and then updated with IP address information during subsequent connection phases (e.g., during RADIUS accounting or DHCP request/acknowledgement phases). The messages in the presence management queue may give rise to a subscriber presence update message, request, or submission sent to the unified directory system. For example, the presence management queue may handle DHCP request/acknowledgement messages from which the presence system updates the subscriber IP address information in the unified directory system. The unified directory system thereby maintains dynamic information about subscribers connected to the network.

The unified directory system includes a data access layer which defines a subscriber profile data store. The data access layer may be implemented as a persistent subscriber profile data store in a first type of memory (e.g., on a hard disk drive) and a cached representation of the persistent subscriber profile data store in a second memory (e.g., in Random Access Memory (RAM)) which is faster than the first memory. The cached representation of the persistent subscriber profile data store provides an extremely fast response time for querying subscriber profile information.

The unified directory system implements a communication interface to the presence system. The communication interface receives subscriber insertion messages and subscriber presence update messages from the presence system in response to the published connection messages received at the presence system. A second interface in the unified directory system (e.g., a hypertext transport protocol (HTTP) interface) receives subscriber profile queries from external systems.

Service logic in the unified directory system processes the subscriber insertion messages, subscriber presence update messages, and the subscriber profile queries. For example, the service logic may insert a subscriber identifier into the data access layer (e.g., in a network service presence table) in response to a subscriber insertion message. As another example, the service logic may query the data access layer in response to the subscriber profile query to obtain a query result. The subscriber profile query may be, as examples, a user status query, a network service data query, or an application service data query. The service logic may then return the query result to the external system.

The message publisher may generate the published connection message according to a common message format for such messages, regardless of the type of subscriber connection message received (e.g. a dynamic host configuration protocol (DHCP) message or a remote authentication dial-in user service (RADIUS) message). The published connection message may include a username and a technical key. The technical key provides subscriber connection identifying information, such as a virtual path identifier (VPI), virtual circuit identifier (VCI), interface identifier, and other identifying information.

Another aspect of the invention is a unified directory system incorporating a data model which stores subscriber profile information. The unified directory system establishes the data model in a data access layer. The data access layer implements a reliable persistent subscriber profile data store in a first memory and a high speed cached representation of the persistent subscriber profile data store in a second memory. The data access layer may include multiple parallel persistent nodes, multiple parallel real-time nodes, and a load balancer which distributes subscriber insertion messages, subscriber presence update messages, and the subscriber profile queries to the nodes.

The data model which stores the subscriber profile information distributes the subscriber data across several layers. In one implementation, the data model includes a customer profile layer defining a customer entity which subscribes to products, a user profile layer defining users belonging to the customer entity, and a product profile layer which defines available products and services. The data model also includes a service profile layer which defines subscribed network and application services, and a presence layer which defines network service presence and application service presence for the subscribed services and applications.

The data model flexibly distinguishes between network services and application services, and allows the unified directory to establish and maintain presence for both the network services and the application services. To that end, the presence layer may include a network service presence table and an application service presence table. The network service presence table dynamically updates the presence status of network services (e.g., updating whether a subscriber is connected to the network), and may exist in a one to many relationship with a network service instance table. The network service instance table instantiates network services subscribed by the users. Similarly, the application service presence table dynamically updates the presence status of application services (e.g., updating whether a subscriber has logged in), and may exist in a one to many relationship with an application service instance table. The application service instance table instantiates application services subscribed by the users.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

FIG. 8 illustrates a published connection message which the message publisher in the presence system may generate from the subscriber connection messages.

FIG. 9 depicts a message publisher output message which the message queue manager in the presence system may send to the message publisher.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although aspects, features, or components of the implementations may be stored in memories, all or part of systems and methods consistent with the subscriber profile access management system, presence system, and unified directory may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the subscriber profile access management system, presence system, and unified directory architectures are described, methods, systems, and articles of manufacture consistent with the subscriber profile access management system, presence system, and unified directory architectures may include additional or different components. For example, processing logic, messaging systems, communication interfaces, message adaptors, and other components may be implemented with microprocessors, microcontrollers, application specific integrated circuits (ASICs), discrete logic, or a combination of other type of circuits or logic. Similarly, memories may be DRAM, SRAM, Flash, disk, or any other type of memory. Flags, data, databases, tables, and other data structures may be separately stored and managed, may be incorporated into a single memory or database, may be distributed, or may be logically and physically organized in many different ways. Programs executed by the components may be parts of a single program, separate programs, or distributed across several memories and processors. Furthermore, the systems may be implemented in hardware, software, or a combination of hardware and software in one processing system or distributed across multiple processing systems.

Figure 1:
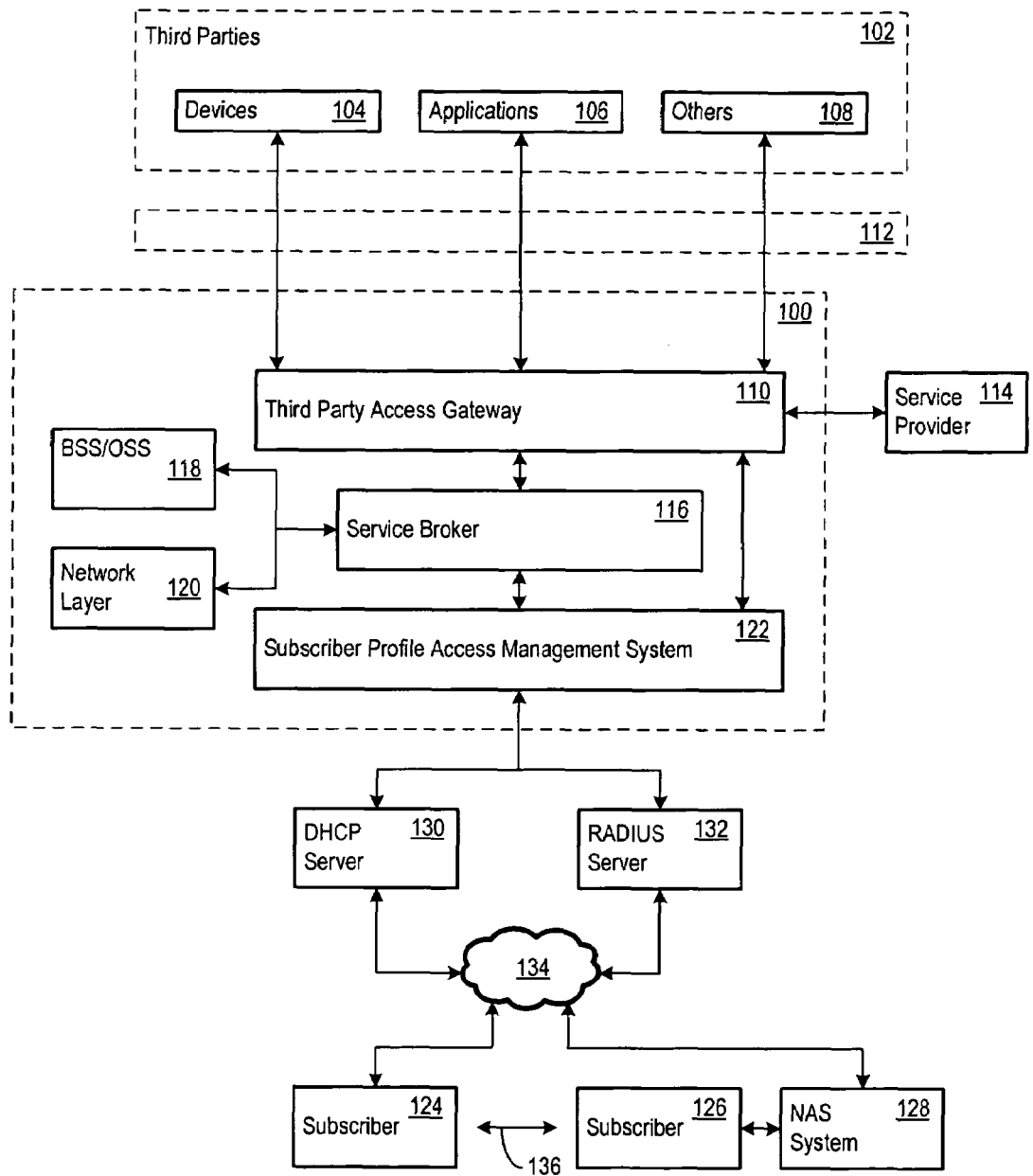
FIG. 1 shows a portion of a telecommunications service provider architecture which includes a subscriber profile access management system.

FIG. 1 shows a portion of a telecommunications architecture 100 which interacts with third parties 102. The third parties 102 may vary widely in form and in implementation. As examples, the third parties 102 may include: subscriber devices 104 such as cellular phones, personal data assistants, network (e.g., Internet) communication devices; applications 106 such as telecommunications service applications implemented by other service providers, such as Short Message Service (SMS) messaging applications, Session Initiation Protocol (SIP) systems, and billing applications which charge customers for products and services; and other devices, programs, or entities 108.

The telecommunications architecture 100 implements functionalities which support telecommunications products and services and exposes selected functionalities to the third parties 102. In addition, the telecommunications architecture 100 includes a subscriber profile access management system 122. As will be explained in more detail below, the access management system 122 establishes and maintains subscriber profile information and provides a single point of access to the subscriber profile information.

The products and services, and their exposed underlying functionalities, may vary between implementations. As examples, the telecommunications architecture 100 may implement SMS messaging services (to deliver and charge for an SMS message), Multimedia Messaging System (MMS) messaging services (to deliver and charge for an MMS message), and SIP services (to setup a SIP call and charge for the call). As additional examples, the telecommunications architecture 100 may implement Charge services (to request to bill a charge against an account), Internet Protocol Television (IPTV) services (to request delivery of television programming), User Status services (to request a current user status, such as 'online', 'offline', 'busy', or 'away'), and user authentication services (e.g., to request verification of whether a mobile user exists and whether the mobile user has the credentials to purchase a desired service, such as IPTV service). Other functionalities may be provided in addition or as alternatives. Furthermore, the telecommunications architecture 100 and may also provide access to communication network services (e.g., Internet browsing services) through the third party access gateway 110.

The telecommunications architecture 100 secures access to the exposed services. To that end, the architecture 100 provides a third party access gateway 110. The third party access gateway 110 acts as a single point of contact for the third parties 102 to the exposed services.

As shown in FIG. 1, the third party access gateway 110 receives service requests 112 from the third parties 102. In response, the third party access gateway 110 verifies that the service request originates with an authenticated and authorized third party. In the case of network communication service requests (as one example), the third party access gateway 110 processes authorized service requests and relays the service requests to service providers 114. In the case of exposed service requests, such as SMS, MMS, and SIP service requests, the third party access gateway 100 may process and relay the authorized service requests to the service broker 116.

The service broker 116 executes the service request. In doing so, the service broker 116 may communicate with Business Support Systems (BSS) and Operation Support Systems (OSS) 118 which the architecture 100 implements to create, deploy, manage, and maintain telecommunications products and services. In executing the service request, the service broker 116 may additionally or alternatively communicate with a network layer 120 which may deliver or return service related data to the service broker 116. Responses from service providers 114 and the service broker 116 are returned to the third-party access gateway 110 for delivery to the originating third party requester.

The subscriber profile access management system 122 receives subscriber profile queries from external systems and also processes subscriber connection messages. The subscriber connection messages may originate from subscribers which attempt to connect to the network (e.g., as an initial step in establishing a communication session between the subscribers). FIG. 1 shows two such subscribers 124 and 126 which establish a SIP based communication session 136. The subscribers 124 and 126 may be cellular phones, personal data assistants, network (e.g., Internet) communication devices; personal computers; programs such as video phone or internet protocol television programs; or other entities.

Any of the subscribers may connect to the subscriber profile access management system 122 through network intermediaries. The network intermediaries may include one or more network access server (NAS) systems 128, dynamic host protocol (DHCP) servers 130 or proxies, and/or remote authentication dial-in user service (RADIUS) servers 132 or proxies. One or more networks 134 may connect the subscribers and network intermediaries to the subscriber profile access management system 122.

Figure 2:
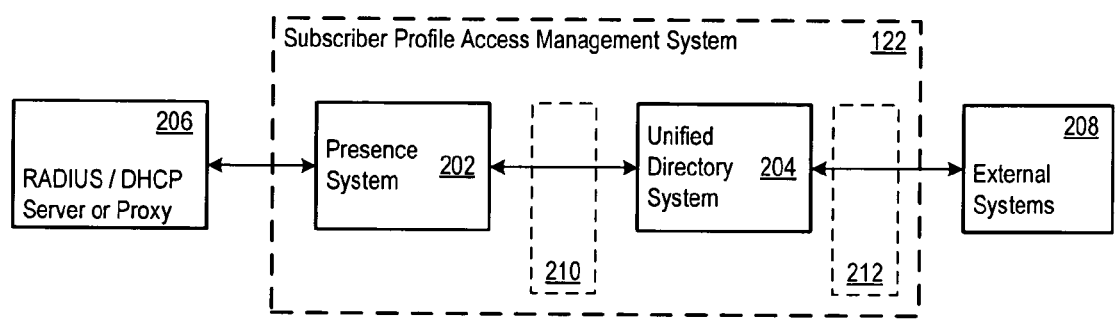
FIG. 2 shows a subscriber profile access management system which processes subscriber connection messages and subscriber profile queries.

FIG. 2 shows the subscriber profile access management system 122. The subscriber profile access management system 122 includes a presence system 202 which provides a single point of access for subscriber authentication and subscriber network presence detection services. RADIUS or DHCP servers or proxies 206 may communicate subscriber connection messages to the presence system 202. As will be explained in more detail below, in response, the presence system 202 may initiate subscriber authentication with the unified directory system 204, update subscriber information in the unified directory system 204, or take other actions.

A unified directory system 204 in the access management system 122 provides a single point of access to subscriber profile information. The unified directory system 204 may respond to subscriber insertion or update messages from the presence system 202, or to subscriber information queries from external systems 208, such as the service broker 116, third party gateway 110, or other systems outside the unified directory system. The external system 208 may query the unified directory system 204 to obtain the requested information about subscriber availability, connection characteristics, device characteristics, or other subscriber profile information. The unified directory system 204 returns query results to the external systems 208.

The subscriber profile access management system 122 implements a communication interface (the "presence interface" 210) between the presence system 202 and the unified directory system 204. In addition, the unified directory system 204 implements a communication interface (the "external interface" 212) between the unified directory system 204 and the external systems 208. The presence interface 210 and/or the external interface 212 may be implemented as a hypertext transfer protocol (HTTP) interface, Java™ database connectivity (JDBC) interface, or other type of communication interface, including an interface for exchanging messages between the systems.

Figure 3:
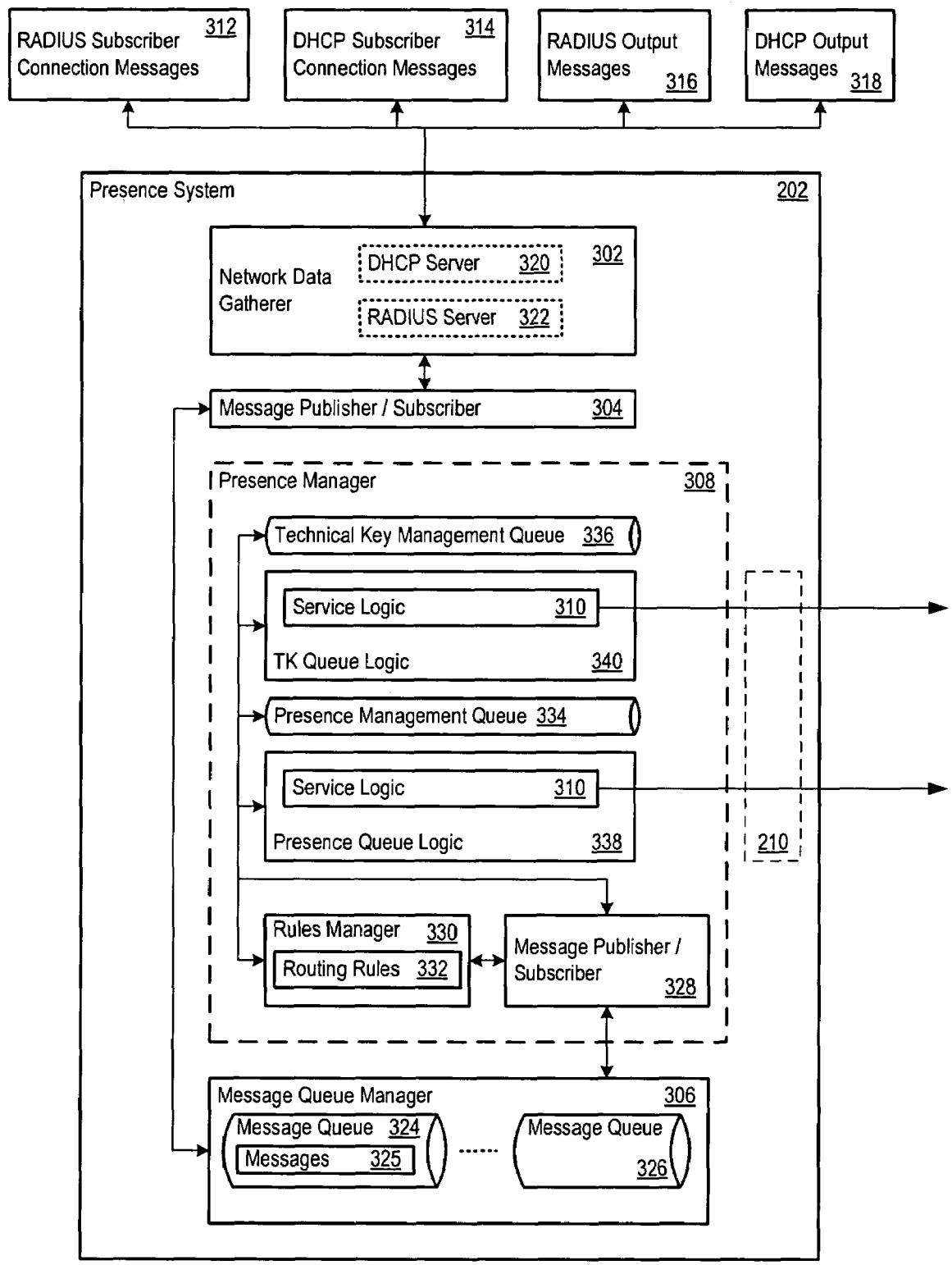
FIG. 3 illustrates a presence system which may be part of a subscriber profile access management system in a telecommunications service provider architecture.

FIG. 3 illustrates the presence system 202 in detail. The presence system 202 includes a network data gatherer 302, message publisher 304, and message queue manager 306. The presence system 202 also includes a presence manager 308.

As shown in FIG. 3, the presence system 202 sends and receives messages to the external network. For example, the presence system 202 may receive subscriber connection messages such as RADIUS messages 312 and the DHCP messages 314. The presence system 202 may respond to RADIUS or DHCP servers or proxies with the RADIUS output messages 316 and the DHCP output messages 318.

In some implementations, however, the presence system 202 may itself implement a RADIUS server or DHCP server. To that end, the presence system 202 may include a DHCP server 320, a RADIUS server 322, or both. Thus, the presence system 202 may receive messages directly from subscribers which are attempting to connect to network resources, instead of receiving DHCP or RADIUS messages 312 and 314 from external systems.

The network data gatherer 302 may include a communication interface and packet listener which monitors network traffic for incoming RADIUS and/or DHCP messages 312 and 314. A separate interface or multiple interfaces may be provided for RADIUS message and DHCP messages. The network data gatherer 302 may be assigned a specific network address, such as an internet protocol (IP) address and port number, or may be addressed in other ways. The RADIUS and DHCP messages 312 and 314 may relate to subscriber network access and may be sent when a subscriber needs to connect to network resources, for example. As another example, the messages may relate to subscriber service use accounting, including accounting start and stop messages.

As one example, a Lucent Technologies™ NavisRadius™ server, available from Lucent Technologies of Murray Hill, N.J. may implement the network data gatherer 302, including the RADIUS server 322. Alternatively or additionally, a Cisco Systems™ DHCP server, available from Cisco Systems, Inc. of San Jose, Calif., may implement the network data gatherer 302, including the DHCP server 320.

The network data gatherer 302 passes the received messages to the message publisher 304. Multiple network data gatherers 302 and/or message publishers 304 may be provided, and a load balancer may distribute the messages between the message publishers 304 using a round robin technique or any other load balancing technique. The message publisher 304 may translate RADIUS and DHCP messages to a common message format for published connection messages. The common format may be employed regardless of whether the received messages are of a first message type (e.g., a RADIUS message) or a second, different, message type (e.g., a DHCP message).

Adapter logic in the message publisher 304 translates the received messages to the common message format. The adapter logic transforms the messages and/or message content from one format (e.g., a format to which RADIUS messages adhere) to another format (e.g., the common format to which the published connection messages adhere). In one implementation, the message publisher 304 parses each received message into an extensible Markup Language (XML) published connection message. Examples of the message formats are given below.

The message queue manager 306 may establish and control one or more messages queues. FIG. 3 shows two message queues 324 and 326. Each message queue may store a particular type of published connection message 325 received from the message publisher 304. For example, the message queue 324 may queue RADIUS messages, while the message queue 326 may queue DHCP messages. The messages may be inserted into the queues depending on subscriber identifiers, connection message request type, or according to any other criteria, however.

The message publisher 304 and/or message queue manager 306 may implement a publish/subscribe messaging interface. For example, a Sonic MQ™ message system, available from Sonic Software of Bedford Mass., may implement the message queue manager 306. Other messaging techniques may be employed, however, including point-to-point message transmission.

The presence manager 308 may include a message publisher/subscriber 328 and a rules manger 330. The rules manager 330 determines message destinations or other processing actions to take based on the routing rules 332. The message destinations may include different message queues, such as the presence management queue 334 and the technical key management queue 336. Processing logic may be provided to retrieve and process the queued messages. FIG. 3 shows presence queue logic 338 which processes messages in the presence management queue 334, and technical key queue logic 340 which processes messages in the technical key management queue 336. Service logic 310, which may be part of the queue logic 338 and 340, provides an interface to the unified directory system 204. Although shown separately in FIG. 3, the queue logic 338 and 340 and service logic 310 are not necessarily distinct programs or circuitry. For example, the queue logic 338 and 340 for processing both queues 334 and 336 and/or the service logic 310 for communicating with the unified directory system 204 may be implemented in a single program or set of circuitry.

The message publisher/subscriber 328 receives published subscriber connection messages from the message queue manager 306. The rules manager 330 processes the received messages and determines their destination according to the routing rules 332. As will be explained in more detail below, the routing rules 332 may specify which of the queues 334 and 336 should queue the received published subscriber connection message. The presence queue logic 338 and technical key queue logic 340 may then retrieve the queued messages and interact with the unified directory system 204 through the service logic 310 as noted below. The presence manager 308 and/or service logic 310 may be implemented with a Sonic ESB™ service bus and message processing system. More generally, any of the elements shown in FIG. 3 may be implemented in hardware, software, or a combination of hardware and software.

Figure 4:
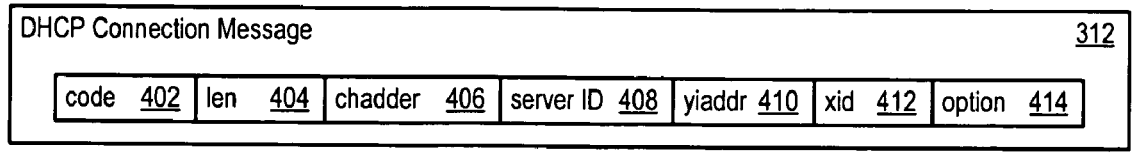
FIG. 4 shows a dynamic host configuration protocol (DHCP) subscriber connection message which the presence system may receive.
Figure 4:
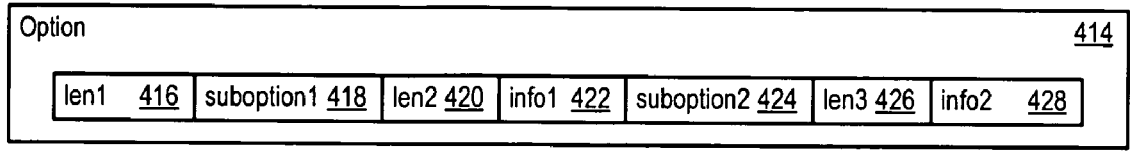
Figure 4:
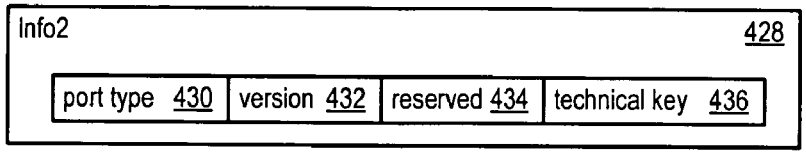
Figure 4:
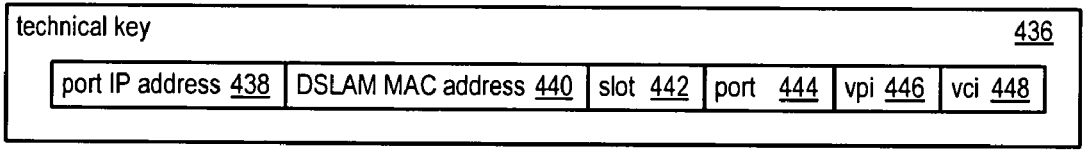

FIG. 4 shows an example of a DHCP connection message 312. The connection message 312 includes a code field 402, a length field 404, and a client hardware address field 406. In addition, the connection message 312 includes a server ID field 408, a yiaddr field 410, an xid field 412, and an option field 414. A description for each field is given below in Table 1.

TABLE 1

DHCP message

| Field | Size (Bytes) | Description | Values |
|---|---|---|---|
| Code | 1 | Command Code - DHCPACK and DHCKNAK messages may be received as the consequence of a DHCP server receiving and processing a DHCPREQUEST message from a subscriber. | 1: DHCPDISCOVER 2: DHCPACK 3: DHCPNAK |
| Length | 1 | Data Length | |
| Chaddr | 6 | Subscriber hardware address | |
| Server ID | 4 | DHCP server IP address | |
| yiaddr | 4 | IP address offered to subscriber through the DHCP process | |
| xid | 4 | DHCP transaction ID | |
| Option | Variable | Optional message data | |

The option field 414 may include additional subscriber connection information, such as a unique identifier. The unique identifier allows other systems, such as Internet service providers to take specific actions based on the identifier. As examples, the systems may use the identifier to identify a subscriber, to assign specific actions to that subscriber (for example, assignment of host IP address, subnet mask, and domain name server (DNS)), to trigger accounting, or take other actions. The option field 414 may adhere to the DHCP Option82 format.

FIG. 4 shows that the option field 414 may include length fields 416, 420, and 426 for the information portions of the option field 414. The information portions may include a first sub-option field 418, a first information field 422, a second sub-option field 424, and a second information field 428. Table 2 below provides a description for each field.

TABLE 2

Option field

| Field | Description |
|---|---|
| Length1 | Data Length of the option field 414 |
| Suboption1 | Optional identifier of a first sub option provided in the option field |
| Length2 | Data length of the first sub option |
| Info1 | Message data for the first sub option - e.g., a circuit identifier |
| Suboption2 | Optional identifier of a second sub option provided in the option field |
| Length3 | Data length of the second sub option |
| Info2 | Message data for the second sub option - e.g., MAC address for a cable interface, technical key, or other data |

The second sub-option field 428 may provide further information about the subscriber connection. The second sub-option field 428 may include a port type 430, a version identifier 432, reserved bytes 434, and a technical key 436. The second sub-option field 428 may support service providers which use ATM routed bridged encapsulation (RBE) to configure digital subscriber line (DSL) access. The second sub-option field 428 may thereby allow service providers to use DHCP to assign IP addresses and implement security and IP assignment policies. Table 3 below provides a description for each field.

TABLE 3

Sub-option 2

| Field | Description |
|---|---|
| Port type | An identifier of a port type (e.g., Routed Bridge Encapsulation) |
| Version | Version identifier for the format of option field 414. |
| Reserved | Reserved bytes for future use |
| Technical Key | A collection of subscriber connection characteristics, such as a network authentication service IP address and/or port. |

FIG. 4 shows the technical key 436 in more detail. The technical key includes a port IP address 438, a Digital Subscriber Line Access Multiplexer (DSLAM) Medium Access Control (MAC) address 440, and a slot identifier 442. The technical key may also include a port identifier 444, a Virtual Path Identifier (VPI) 446, and a Virtual Circuit Identifier (VCI) 448. Table 4, below, provides a description for each field:

TABLE 4

Technical Key

| Field | Description |
|---|---|
| Port IP address | IP address of an interface on a DHCP relay agent. |
| DSLAM MAC address | The MAC address of the DSLAM through which the subscriber connects. |
| Slot | Slot identifier of the virtual circuit on which the DHCP request has arrived. |
| Port | Port identifier of the virtual circuit on which the DHCP request has arrived. |
| VPI | Virtual Path Identifier of the virtual circuit on which the DHCP request has arrived. |
| VCI | Virtual Circuit Identifier of the virtual circuit on which the DHCP request has arrived. |

Figure 5:
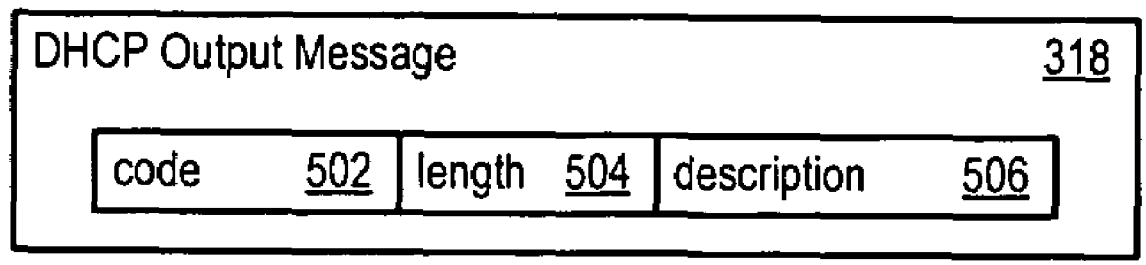
FIG. 5 shows a DHCP subscriber connection response message which the presence system may send.

FIG. 5 shows a DHCP subscriber connection output message 318 which the presence system 202 may send in response to receiving and processing a DHCP subscriber connection message. The output message 318 may include a code field 502, a length field 504, and a description field 506. Table 5, below, provides a description of each field.

TABLE 5

DHCP subscriber connection output message

| Field | Size (Bytes) | Description | Values |
|---|---|---|---|
| Code | 1 | Command Code | 1: SUCCESS 2: ERROR |
| Length | 1 | Data Length | |
| Description | Variable | A text description of the result condition | |

Figure 6:
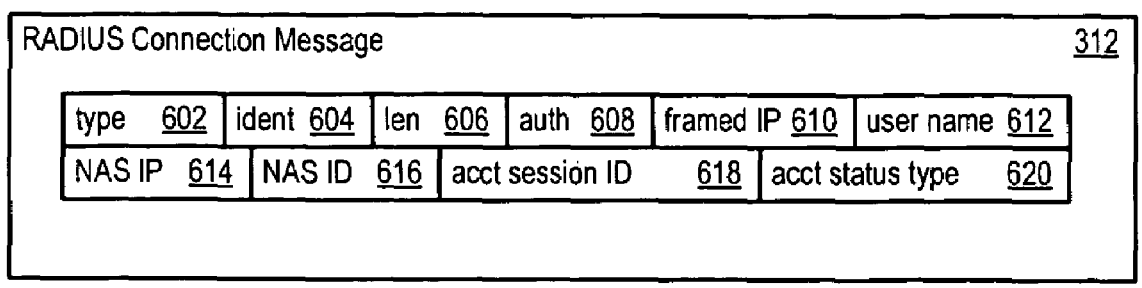
FIG. 6 shows a remote authentication dial-in user service (RADIUS) subscriber connection message which the presence system may receive.

FIG. 6 shows a RADIUS subscriber connection message 312 which the presence system 202 may receive. The RADIUS subscriber connection message 312 may include a type field 602, an identifier field 604, and a length field 606. The message 312 may further include an authenticator field 608, a framed IP address field 610, and a user name field 612. Additional fields include the NAS IP address field 614, NAS ID field 616, account session ID field 618, and account status type field 620. Table 6, below, provides a description for each field.

TABLE 6

RADIUS subscriber connection message

| Field | Size (Bytes) | Description | Values |
|---|---|---|---|
| Type | 1 | Command Code which indicates the type of RADIUS message | 1: Access-Request |
| Ident | 1 | Request Identifier which matches a request with a corresponding response | 2: Accounting-Request |
| Length | 1 | Data Length of the RADIUS message. | |
| Auth | 16 | Authenticator Field which contains information which the RADIUS client and server use to authenticate each other | |
| Framed IP | 4 | IP address offered to the subscriber | |
| Username | >=3 | Subscriber username | |
| NAS IP | 4 | NAS IP address | |
| NAS ID | >=3 | NAS identifier (e.g., a domain name for the NAS) | |
| Account session | >=3 | Node Line Card (Slot/Port) and Circuit IDs (VPI/VCI) | |
| Account status type | 6 | Accounting Request Type | Start, Stop, Interim-Update |

Figure 7:
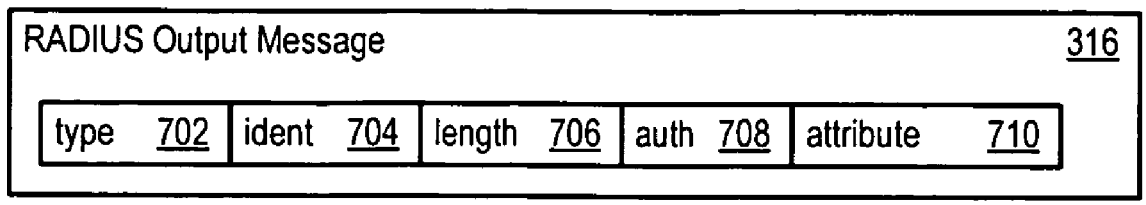
FIG. 7 shows a RADIUS response message which the presence system may send.

FIG. 7 shows a RADIUS response message 316 which the presence system 202 may send. The RADIUS response message 316 may include a type field 702, an identifier field 704, and a length field 706. The response message 316 may also include an authenticator field 708 and an attribute field 710. Table 7, below, provides a description for each field.

TABLE 7

RADIUS response message

| Field | Size (Bytes) | Description | Values |
|---|---|---|---|
| Type | 1 | Command Code | 2: Access-Accept 3: Access-Reject 4: Accounting-Response |
| Identifier | 1 | Request Identifier | |
| Length | 1 | Data Length | |
| Authenticator | 16 | Authenticator Field | |
| Attribute | >=7 | Accounting response result description. May include multiple sub-fields: a vendor specific attribute identifier, length, and data field. | OK, NOK |

An example of a RADIUS access-request message is given below in Table 8. The access-request message may be sent from a RADIUS server in response to a subscriber attempt to connect to the network.

TABLE 8

RADIUS access-request message

| Field | Value |
|---|---|
| Type | 1 |
| Ident | 11 |
| Length | 167 |
| Auth | |
| Framed IP | |
| Username | "test123@123.testtest1.com" |
| NAS IP | 99.222.66.111 |
| NAS ID | "rm100.aaa.testtest1.com" |
| Account session | "3/0/0/1.1__00000483" |
| Account status type | |

An example of a RADIUS accounting-request message is given below in Table 9. the accounting-request message may be sent to start or stop accounting of subscriber usage of network resources.

TABLE 9

RADIUS accounting-request message

| Field | Value |
|---|---|
| Type | 4 |
| Ident | 12 |
| Length | 198 |
| Auth | |
| Framed IP | |
| Username | "magictested@123.testtest1.com" |
| NAS IP | 99.222.66.111 |
| NAS ID | "rm100.aaa.testtest1.com" |
| Account session | "3/0/0/1.1__00000483" |
| Account status type | Start |

Table 10 gives an example of a corresponding RADIUS access-accept output message.

TABLE 10

RADIUS access-accept output message

| Field | Value |
|---|---|
| Type | 2 |
| Identifier | 11 |
| Length | 3 |
| Authenticator | |
| Attribute | OK |

Table 11 gives an example of a corresponding RADIUS accounting-response output message.

TABLE 11

RADIUS accounting-response output message

| Field | Value |
|---|---|
| Type | 5 |
| Identifier | 12 |
| Length | 198 |
| Authenticator | |
| Attribute | 26 (attribute identifier), 2 (attribute length), OK (attribute data) |

FIG. 8 illustrates a published connection message 325 which the message publisher 304 in the presence system 202 may generate from the subscriber connection messages. The published connection messages 325 may be XML messages, or other types of messages. The published connection message 325 may adhere to a common message format which includes a message type field 802, a username field 804, and a server IP field 806. The published connection message 325 also includes a client IP field 808, an access server IP field 810, and an access server identifier field 812. The common message format also includes a slot field 814, port field 816, interface field 818, VPI field 820, and VCI field 822 are also present. Table 12 provides a description of each field.

TABLE 12

Published connection message

| Field | Type | Description | Values |
| --- | --- | --- | --- |
| msgType | Integer | Command Code | 1: DHCPDISCOVER<br>2: DHCPACK<br>3: DHCPNAK<br>4: ACCESSREQUEST<br>5: ACCTSTART<br>6: ACCTSTOP |
| Username | String | Username or client MAC address | |
| Server IP | String | RADIUS or DHCP server IP address | |
| Client IP | String | IP address offered to the subscriber | |
| Access Server IP | String | NAS or DSLAM IP address | |
| Access server ID | String | NAS identifier or DSLAM MAC address | |
| Slot | Integer | Slot identifier | |
| Port | Integer | Port identifier | |
| Interface | Integer | Interface identifier | |
| VPI | Integer | VPI identifier | |
| VCI | Integer | VCI identifier | |

FIG. 9 illustrates a message publisher output message 900 which the message publisher 304 in the presence system 202 may send in response to receipt of a published connection message 325. The output message 900 may include a code field 902 and a description field 904. Table 13 provides a description of each field.

TABLE 13

Message publisher output message

| Field | Type | Description | Values |
| --- | --- | --- | --- |
| Code | Integer | Command Code | 1: SUCCESS<br>2: ERROR |
| description | String | A text description of the result condition | |

Table 14a provides an example of an XML published connection message. The example in Table 14a is consistent with the common format shown in Table 12 for an access request from a subscriber. The published connection message identifies the technical key using the <tk> tag.

TABLE 14a

XML published connection message

```
<?xml version="1.0" ?>
<msg>
<msgType>4</msgType>
```

TABLE 14a-continued

XML published connection message

```
<username>44-45-53-54-42-00</username>
<serverIP>10.107.109.182</serverIP>
<clientIP>121.56.134.45</clientIP>
<tk>
    <accessServerIP>10.107.108.204</accessServerIP>
    <accessServerID>92.168.132.8</accessServerID>
    <slot>3</slot>
    <port>0</port>
    <interface>1</interface>
    <vpi>245</vpi>
    <vci>34</vci>
</tk>
</msg>
```

Table 14b provides an example of an XML message publisher output message 900 for the access request. In this example, the output message conveys an error in the attempt to authorize the subscriber for network access because the subscriber's username is not recognized.

TABLE 14b

XML message publisher output message

```
<?xml version="1.0" ?>
<msg>
    <code>2</code>
    <description>username not present</description>
</msg>
```

As an example of the processing performed by the presence system 202, the presence system 202 may receive a RADIUS subscriber connection message 312 which specifies that a subscriber is requesting access to network services. The message type is type 1: Access-Request. The presence system 202 will authorize the subscriber, and may act as the single point of contact for RADIUS, DHCP, and other systems to provide subscriber authorization. To that end, the network data gatherer 302 first receives the access-request message and passes it to the message publisher 304.

The message publisher 304 translates the message to create a new message which adheres to a common format for published connection messages. The message publisher 304 generates an XML common format connection message with the field shown above in Tables 12 and 14. The data for the common format connection message may be extracted from or derived from the fields in the access-request subscriber connection message.

Once the common format connection message is formed, the message publisher 304 publishes the message. As a result, the message queue manager 306 receives the published message and inserts the published message into the appropriate queue 324, 326. For example, the message queue manager 306 may insert the published connection message into a queue assigned to handle access request messages.

The message queue manager 306 retrieves the published connection message and sends it to a message subscriber, such as the presence manager 308. The message publisher/subscriber 328 in the presence manager 308 receives the published connection message. The rules manager 330 applies the routing rules 332 to the data in the published connection message to determine a destination for the published connection message.

As one example, the routing rules 332 may be implemented as shown in Table 15:

TABLE 15

Routing rules

```
If msgType == 1 or msgType == 4)
    then insert published connection message into the technical key
management queue;
else    /* msgType is 2, 3, 5, or 6 */
    insert published connection message into the presence
management queue.
If an error occurs,
    then send a NOK message to the rules manager.
```

Thus, the technical key management queue 336 handles messages for subscriber access requests and DHCPDISCOVER requests (i.e., requests which a subscriber sends to locate a DHCP server). In this instance, the technical key management queue 336 receives the published connection message. The technical key management queue 336 holds messages for which subscriber authentication is desired. The authentication may be based on the technical key in the published connection message, as will be explained in more detail below.

The TK queue logic 340 periodically services the technical key management queue 336. Thus, the TK queue logic 340 retrieves the queued message. The TK queue logic 340 processes the queued message according to a set of rules implemented in hardware or software in the TK queue logic 340. Table 16 provides one example of the TK queue logic processing rules. In Table 16, 'tk' refers to the technical key fields provided in the published subscriber connection message between the <tk> and </tk> tags.

TABLE 16

TK queue logic processing rules

```
Select * from SDP_CUST_NET_SVC_T where CUSTID =
(select CUSTID from
SDP_USR_T where USRID='username')
If TK Parameters retrieved from SDP_CUST_NET_SVC_T == tk then
    If 'username' and CUSTNETSVCID not in SDP_NET_PRES_T then
        insert 'username' and CUSTNETSVCID into SDP_NET_PRES_T;
            send OK message to the rules manager;
    else
        Send NOK message to the rules manager;
If any error occurs, send NOK message to the rules manager.
```

In general, the TK queue logic processing rules match the technical key information against technical keys stored in the unified directory. When the subscriber is authenticated, the associated subscriber information (e.g., a username) is inserted into the unified directory system. Subsequently, additional subscriber information, such as IP address, may be updated in the unified directory system during subsequent connection phases (e.g., during RADIUS accounting or DHCP request/acknowledgement phases). Thus, the TK queue logic 340 may issue one or more queries to the unified directory system 204 in processing the rules shown in Table 16. A query may obtain each customer ID matching the username specified in the published connection message from the user table (Table 19). The same query or a second query to the unified directory system 204 selects all the fields from the network service instance table (Table 27) for the matching customer (including the ACCESSSERVERID, ACCESSSERVERIP, SLOT, PORT, INTERFACE, VCI, AND VPI fields which form the technical key). The network service instance table defines active network services for each customer. Thus, the subscriber/customer is an authenticated user of a network service if the subscriber has a matching record in the user table, the network service instance table establishes a network service for the user, and the technical key provided in the published connection message matches the technical connection information which the unified directory system 204 has recorded for the subscriber in the network service instance table.

If the subscriber is authenticated, then the presence system 202 tracks the subscriber connection. To that end, the presence system 202 sends an insertion message to the unified directory system 204 to cause insertion of the 'username' into the USRID field into the network presence table (Table 31) and insertion of the CUSTNETSVCID retrieved from the network service instance table into the network presence table. The CUSTNETSVCID field provides a unique identifier of an association between a customer and a network service.

Thus, the presence system 202 helps to maintain current presence information about subscriber access and presence with regard to network resources. In addition, when the subscriber is authenticated, the presence manger 308 returns a success or OK message back through the message queue manager 306, the message publisher 304, network data gatherer 302, and to the RADIUS server from which the subscriber connection message originated. The RADIUS server may thereby confirm with the subscriber that access is granted.

As another example of the processing performed by the presence system 202, the presence system 202 may receive a RADIUS accounting-request start message 312 which specifies that accounting should start for the subscriber. The accounting-request message specifies a message type of '2', and an account status type of 'Start'. The network data gatherer 302 passes the RADIUS connection message 312 to the message publisher 304.

The message publisher 304 translates the message to create a new XML message which adheres to the common format for published connection messages. Once the message publisher 304 has generated and published the message, the message queue manager 306 receives the published connection message and inserts the message into the appropriate queue 324, 326. For example, the message queue manager 306 may insert the published connection message into a queue assigned to handle presence updates, RADIUS messages, accounting start messages, or another queue.

The message queue manager 306 retrieves the published connection message and sends it to the presence manager 308. The message publisher/subscriber 328 in the presence manager 308 receives the published connection message. The rules manager 330 applies the routing rules 332 to the data in the published connection message to determine a destination for the published connection message. As shown in Table 15, the routing rules may result in the insertion of the published connection message (which has a msgType of 5) into the presence management queue 334.

The presence management queue 334 handles messages which indicate subscriber activity on the network, and based on which the presence system 202 may provide a presence update to the unified directory 204. The presence update keeps the unified directory system 204 informed about ongoing subscriber connectivity to network resources, and provides real-time tracking of subscriber connection information.

The presence queue logic 338 periodically services the presence management queue 334. The presence queue logic 338 retrieves the queued message and processes the queued message according to a set of rules implemented in hardware or software in the presence queue logic 338. Table 17 provides one example of the presence queue logic processing rules.

TABLE 17

Presence queue logic processing rules

Select * from SDP_CUST_NET_SVC_T where
CUSTID = (select CUSTID from
SDP_USR_T where USRID='username')
If 'username' and CUSTNETSVCID not in SDP_NET_PRES_T then
   insert 'username', CUSTNETSVCID, and 'clientIP' into
   SDP_NET_PRES_T;
     send OK message to the rules manager;
else
     update 'clientIP' in SDP_NET_PRES_T;
     send OK message to the rules manager.
If any error occurs, send NOK message to the rules manager.

The rules shown in Table 17 may be implemented in or more queries to the unified directory system 204. A first query obtains each customer ID matching the username specified in the published connection message from the user table (Table 19). The same query or a second query to the unified directory system 204 selects all the fields from the network service instance table (Table 27) for the matching customer. Thus, the presence system 202 will manage subscriber presence for those subscribers/customers who have a matching record in the user table and the network service instance table.

Specifically, the rules shown in Table 17 check whether the 'username' and CUSTNETSVCID are not yet present in the network service presence table. If they are not present, then the presence system 202 may send a subscriber insertion message to the unified directory system 204. The subscriber insertion message causes the unified directory system 204 to insert the 'username' into the CUSTID field, insert the CUSTNETSVCID, and insert the 'clientIP' into the IP field in the network service presence table. However, if the subscriber is already present in the network presence table, then the presence system 202 may send a subscriber update message to the unified directory system 204 to cause an update to the 'clientIP' field in the network service presence table. The presence system 202 thereby tracks current connection information for the subscriber.

Figure 10:
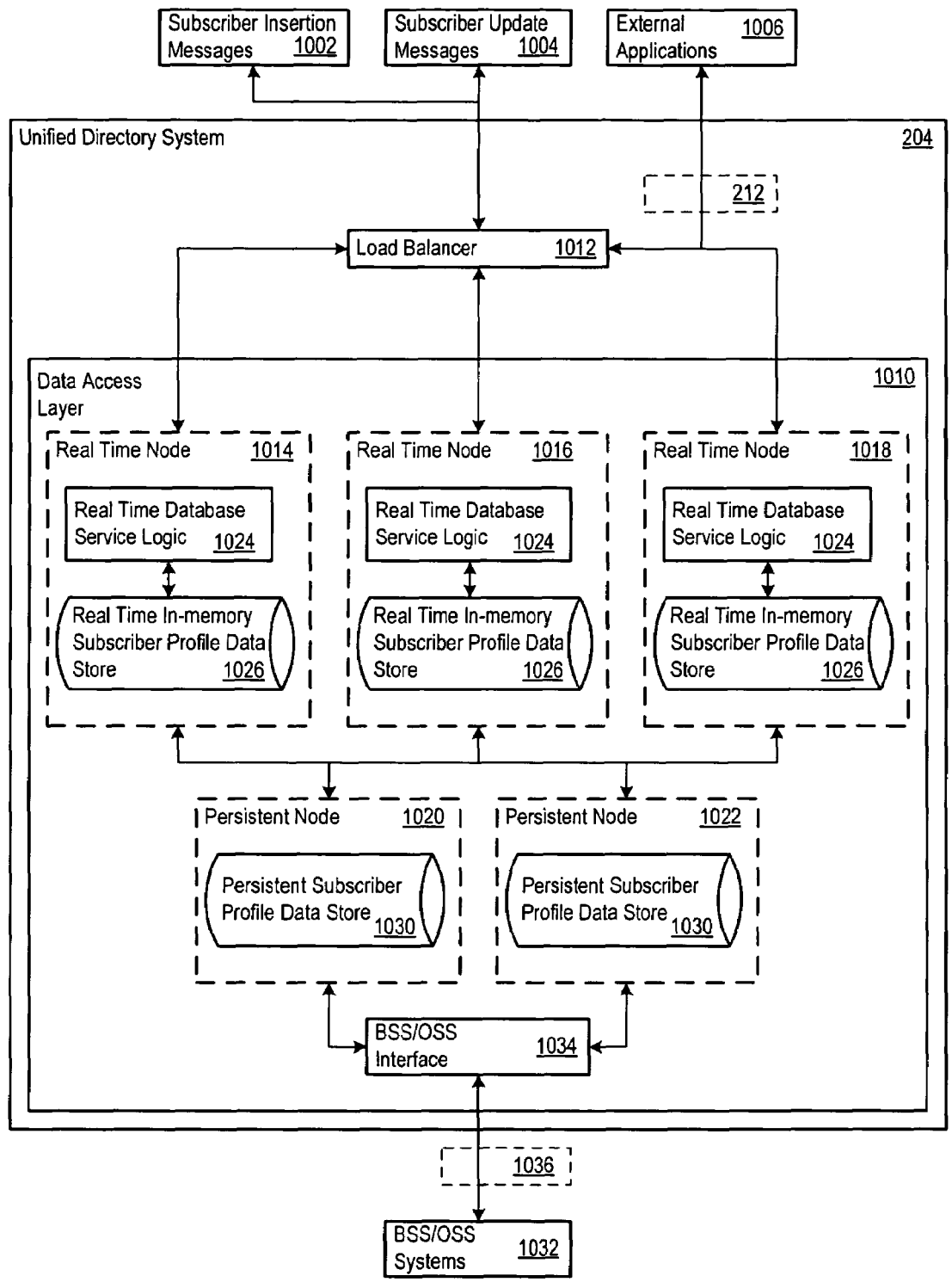
FIG. 10 shows a unified directory system which may be part of a subscriber profile access management system in a telecommunications service provider architecture.

FIG. 10 shows a unified directory system 204 which may be part of the subscriber profile access management system 122. The unified directory system 204 receives subscriber insertion messages 1002 and subscriber update message 1004 from the presence system 202. The subscriber insertion messages 1002 may request the unified directory to insert subscriber profile information into the subscriber profile data store as noted above with regard to Tables 16 and 17. Similarly, the subscriber update messages 1004 may request the unified directory to update subscriber profile information (e.g., the client IP address) in the unified directory.

The external interface 212 connects the unified directory system 204 with other data processing systems or applications 1006. The external applications 1006 may send subscriber profile queries to the unified directory system 204. The unified directory system 204 may provide a single point of access to the subscriber profile information for any number of external applications 1006. The subscriber profile data may thereby be centralized in the unified directory system 204, eliminating the dispersal of subscriber profile information among multiple product and service support systems.

The unified directory system 204 includes a data access layer 1010. In a high performance environment, the unified directory system 204 may also include a load balancer 1012 which distributes messages to the data access layer 1010. The load balancer 1012 may distribute the messages in a round robin manner or in other ways.

The data access layer 1010 includes one or more real time nodes (FIG. 10 shows an example with three real time nodes labeled 1014, 1016, and 1018) and one or more persistent nodes (FIG. 10 shows an example with two real time nodes labeled 1020 and 1022). Each real time node may include real time database service logic 1024 and a high performance database 1026. Each persistent node 1020 may include a persistent database 1030. The database service logic 1024 may include a database management system which executes database queries on the high performance databases 1026. The service logic 1024 may also implement a communication interface (e.g., a Sonic ESB™ HTTP interface) for sending and receiving messages to the presence system 202 and the external systems and applications 1006. Thus, the service logic 1024 receives and processes the HTTP messages received through the load balancer. The HTTP messages are then processed in the individual real time nodes 1014-1018, with each node 1014-1018 handling part of the message servicing load.

Each persistent node 1020-1022 may include a database management system which executes database insertion and update operations. The persistent nodes 1020-1022 may receive database insertion and update messages from external systems, such as a Business Support System (BSS) or Operational Support System (OSS) 1032 in the telecommunications architecture. To that end, the unified directory system 204 may provide a BSS/OSS message interface 1034, which implements an HTTP, Service Provisioning Markup Language (SPML), or other interface and which may support the exchange of user, resource and service provisioning information between cooperating systems, including the BSS/OSS systems 1032.

The databases 1026 and 1030 store copies of a subscriber profile data store. The persistent databases 1030 may be implemented on disk with a database management system such as the Oracle 9i™ system available from Oracle Corporation of Redwood Shores, Calif. The high performance databases 1026 may be implemented in a memory system which is faster than the memory system which supports the persistent databases 1030. For example, the high performance databases 1026 may be implemented in Random Access Memory (RAM) as cached copies of the persistent subscriber profile data stores. A TimesTen™ database system, also available from Oracle Corporation, may implement the real time nodes 1014-1018.

In other implementations, the real time nodes 1014-1016 cache a portion of the subscriber profile data store. For example, the real time nodes 1014-1016 may cache only the network service presence table (Table 31) and/or the application service presence table (Table 32). These tables store volatile or relatively frequently changing data (e.g., the subscriber CPE IP address). There is a reduced need to keep the persistent nodes 1022-1024 consistent with such data. Furthermore, the high speed implementation of the real time nodes 1014-1018 allows the unified directory system 204 to response extremely quickly to queries for current subscriber profile information.

The real time nodes 1014-1016 provide extremely fast response time to subscriber profile queries, while the persistent nodes 1022 and 1024 may handle subscriber profile insertion and update messages 1002 and 1004 (e.g., JDBC transactions). The load balancer 1012 distributes the incoming messages to the nodes 1014-1022, each of which may handle a portion of the load, provide a fault tolerant architecture, and handle hundreds or thousands of incoming messages per second. As an example, each real time node may handle 500 queries or more per second, while the persistent nodes may handle 200 JDBC transactions per second. The nodes 1014-1022 may be implemented on a SUN480 available from Sun Microsystems of Santa Clara, Calif. or similar servers available from other vendors. The response capability of the data access layer 1010 may be expanded by both adding processors to the nodes 1014-1022 and by adding additional nodes 1014-1022.

Figure 11:
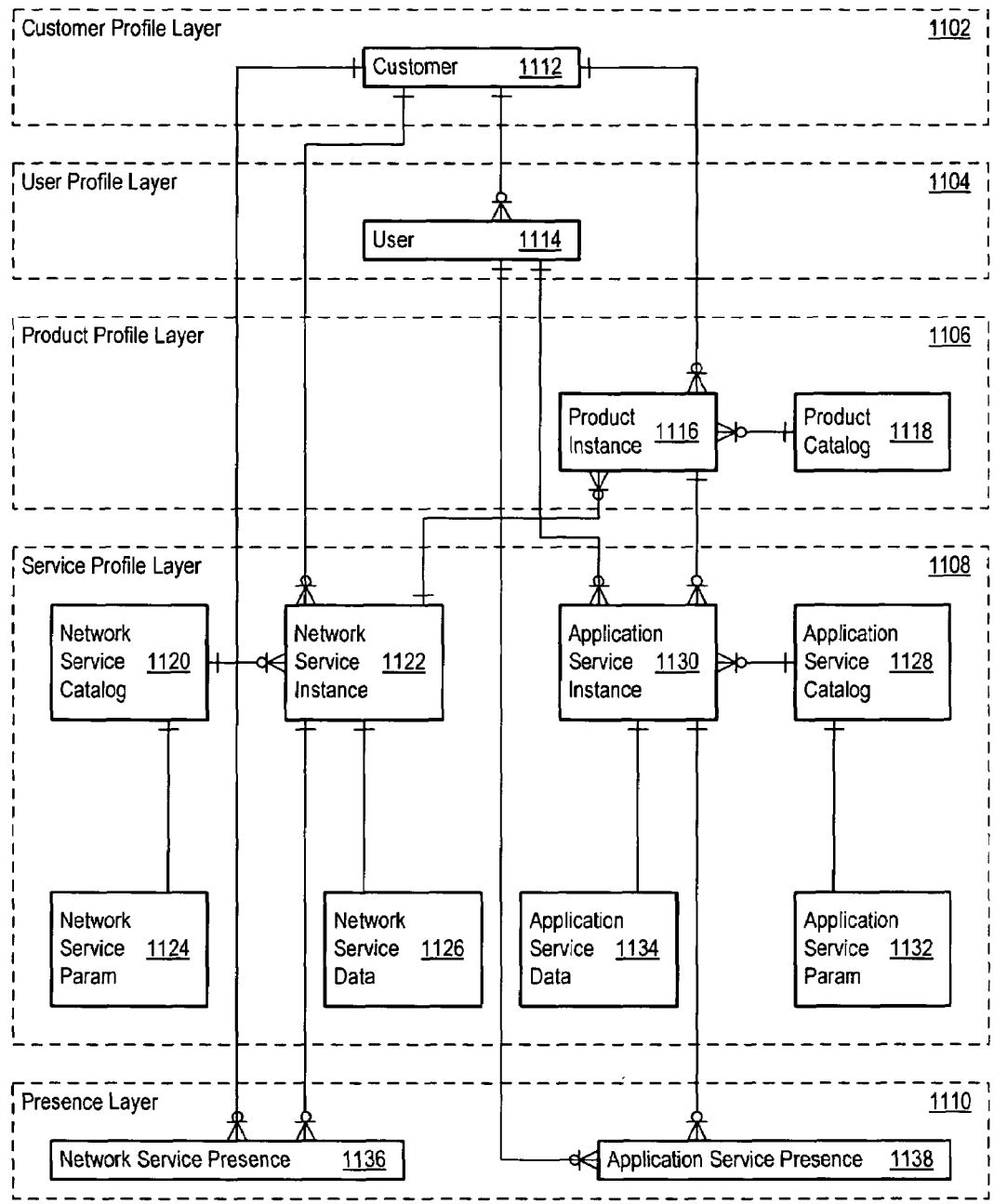
FIG. 11 shows a data model which may implement a subscriber profile data store which the unified directory system maintains.

FIG. 11 shows a data model 1100 which may implement the subscriber profile data store which the nodes 1014-1022 store and maintain. The data model 1100 is divided into a customer profile layer 1102, a user profile layer 1104, and a product profile layer 1106. In addition, the data model 1100 also defines a service profile layer 1108 and a presence layer 1110. The division of the data model 1100 into layers efficiently segments subscribe profile data into dynamically changing information in the presence layer 1110, and more static information in the service profile layer 1108. The table structure defined in the data model 1100 also provides a technical solution to separating network services from application services. Thus, presence information for each may be independently established and maintained for any subscriber.

The customer profile layer 1102 defines a customer table 1112. The customer table 1112 may establish the data fields which characterize a physical person or legal entity which subscribes to telecommunication service products. The user profile layer 1104 defines a user table 1114. The user table 1114 may establish data fields which characterize a physical person who subscribes to one or more products and/or services (e.g., an instant messaging application) and the services available on the products (e.g., instant messaging service).

The product profile layer 1106 defines a product instance table 1116 and product catalog tables 1118. The product instance table 1116 establishes the data fields which instantiate telecommunication service provider offerings, such as a particular service or product. The product catalog tables 1118 establishes the data fields which instantiate a whole catalog of products and special offers available from the telecommunication service provider.

The service profile layer 1108 defines a network service catalog table 1120, a network service instance table 1122, a network service parameters table 1124, and a network service data table 1126. The network service catalog table 1120 instantiates a catalog of network services offered by a telecommunications service provider. The network service instance table 1122 instantiates a particular network service offered on a product which a subscriber has access to. The network service parameters table 1124 instantiates parameters applicable to network services in the catalog of network services. The network service data table 1126 instantiates the data which characterizes a particular network service instance.

The service profile layer 1108 also defines an application service catalog table 1128, an application service instance table 1130, an application service parameter table 1132, and an application service data table 1134. The application service catalog table 1128 instantiates a catalog of application services offered by a telecommunications service provider. The application service instance table 1130 represents a particular application service offered on a product which a subscriber has access to. The application service parameters table 1132 instantiates parameters applicable to application services in the catalog of network services. The application service data table 1134 instantiates the data which characterizes a particular application service instance.

The presence layer 1110 defines a network service presence table 1136 and an application service presence table 1138. The network service presence table 1136 establishes the data fields which characterize network resource access connectivity, keeping track of recent subscriber connection information with respect to the network services (e.g., an established connection to a DSL network service). The application service presence table 1138 establishes the data fields which characterize subscriber access to application services, including whether the subscriber is logged in to or out of any of the subscribed application services (e.g., whether the subscriber is logged into an instant messaging application service).

Table 18 below provides an example implementation of the customer table 1112.

TABLE 18

Customer Table

SDP_CUST_T                      CUSTOMER

| FIELD | TYPE | DESCRIPTION |
|---|---|---|
| CUSTID | NUMBER(20) | Customer Identifier, may be a primary key. |
| ENTNAME | VARCHAR2(50) | Name Of The Enterprise |
| FIRSTNAME | VARCHAR2(50) | First Name |
| MIDDLENAME | VARCHAR2(50) | Middle Name |
| SURNAME | VARCHAR2(50) | Second Name |
| ENTFISCALCODE | VARCHAR2(50) | Enterprise Fiscal Code |
| FISCALCODE | VARCHAR2(50) | Fiscal Code |
| LEGALSTATUS | VARCHAR2(50) | Legal Status |
| DATEOFBIRTH | DATE | Date Of Birth |
| PLACEOFBIRTH | VARCHAR2(50) | Place Of Birth |
| CIVILSTATUS | VARCHAR2(20) | Civil Status |
| GENDER | CHAR(1) | Gender, e.g., 'M' or 'F' |
| TEL | VARCHAR2(50) | Telephone Contact |
| CONTACTTEL | VARCHAR2(50) | First Tel Contact |
| CONTACTTEL2 | VARCHAR2(50) | Second Tel Contact |
| CONTACTFAX | VARCHAR2(50) | Contact Fax |
| MOBILETEL | VARCHAR2(50) | Mobile Phone Number |
| FAX | VARCHAR2(50) | Fax Contact |
| CUSTTYPE | VARCHAR2(20) | Customer Type |

Table 19 below provides an example implementation of the user table 1114.

TABLE 19

User Table

SDP_USR_T — USER

| FIELD | TYPE | DESCRIPTION |
|---|---|---|
| USRID | VARCHAR2(20) | Username@Domain, may be a primary key. |
| CUSTID | NUMBER(20) | Customer Identifier, may be a foreign key from SDP_CUST_T |
| ISMASTER | CHAR(1) | Flag Indicating If User Is Master User |
| ISFIRSTCONNECT | CHAR(1) | Flag Indicating If User Is A Default User For Subscription |
| DISPLAYNAME | VARCHAR2(100) | Full Name Of User |
| IDENTITY | VARCHAR2(50) | Provides an alias identity for the subscriber, such as a nickname or other alias which the subscriber uses with instant messaging, chat, or other telecommunication services. |
| PWD | VARCHAR2(50) | Password |
| USRSTATUS | VARCHAR2(20) | USER STATUS, e.g., Active, Blocked, Pending, Configured. May Default To 'Active' |
| CREATEDATE | DATE | CREATION DATE, May Default To The System Date |
| EXPDATE | DATE | Expiry Date |
| LASTMODIFYDATE | DATE | Last Modification Date |
| LASTMODIFYDESC | VARCHAR2(50) | Last Modification Description |
| LASTMODIFYWRITER | VARCHAR2(50) | Last Modification Writer |
| FIRSTCONNECTDATE | DATE | First Ever Connection Date |
| LASTCONNECTDATE | DATE | Last Ever Connection Date |
| AUTHTYPE | VARCHAR2(20) | Type Of Authentication |

Tables 20, 21, and 22 below provide an example implementation of the product profile layer 1106.

TABLE 20

Product Instance Table

SDP_SUB_T — PRODUCT INSTANCE

| FIELD | TYPE | DESCRIPTION |
|---|---|---|
| SUBID | NUMBER(20) | Subscription Identifier, may be a primary key |
| CUSTID | NUMBER(20) | Customer Identifier, may be a foreign key from SDP_CUST_T |
| PRODCODE | VARCHAR(20) | Product Code, may be a foreign key from SDP_PROD_T |
| CUSTNETSVCID | NUMBER(20) | Customer Network Service Combination Identifier, may be a foreign key from SDP_CUST_NET_SVC_T |
| SUBSTATUS | VARCHAR2(20) | Subscription Status, may default to Active |
| BILLINGCLI | VARCHAR2(24) | Billing Call Line Identifier |
| CREATEDATE | DATE | Creation Date, may default to the System Date |
| EXPDATE | DATE | Expiry Date |
| SUBTYPE | VARCHAR2(20) | Subscription Type |
| BILLINGTYPE | VARCHAR2(20) | Type Of Billing |
| LASTMODIFYDATE | DATE | Last Modification Date |
| LASTMODIFYDESC | VARCHAR2(50) | Last Modification Description |
| LASTMODIFYWRITER | VARCHAR2(50) | Last Modification Writer |

TABLE 21

Product Catalog Table

| SDP_PROD_T | PRODUCT CATALOGUE | |
|---|---|---|
| FIELD | TYPE | DESCRIPTION |
| PRODCODE | VARCHAR2(20) | Product Code, may be a primary key |
| OFFERCODE | VARCHAR2(20) | Product Offering Identifier, may be a foreign key from SDP_OFFER_T |
| PRODNAME | VARCHAR2(50) | Name Of The Product |
| PRODTYPE | VARCHAR2(20) | Type Of The Product |
| PRODCODE | VARCHAR2(20) | Code Of The Product |
| PRODSTATUS | VARCHAR2(20) | Status Of The Product |

TABLE 22

Product Offer Table

| SDP_OFFER_T | PRODUCT CATALOGUE | |
|---|---|---|
| FIELD | TYPE | DESCRIPTION |
| OFFERCODE | VARCHAR2(20) | Product Offering Identifier, may be a primary key |
| OFFERNAME | VARCHAR2(100) | Product Offering Name |
| OFFERSTATUS | VARCHAR2(20) | Product Offering Status |
| COMOFFERTYPE | VARCHAR2(50) | Commercial Product Offering Name |

Tables 23, 24, 25, 26, 27, 28, 29, and 30 below provide an example implementation of the service profile layer 1108. The service profile layer allows the data model 1100 to distinguish between network services and application service. The network services may be services offered by telecommunication operators which permit subscribers to connect to the network (e.g., DSL service or dial-up service). The application services may represent the applications (e.g., programs) which the subscriber may use over the network (e.g., instant messaging, IPTV, and VoIP applications).

TABLE 23

Application Service Instance Table

| SDP_USR_SVC_T | APPLICATION SERVICE INSTANCE | |
|---|---|---|
| FIELD | TYPE | DESCRIPTION |
| USRSVCID | NUMBER(20) | User - Service Combination Identifier, may be a primary key |
| SVCCODE | VARCHAR2(20) | Service Identifier, may be a foreign key from SDP_SVC_T |
| USRID | VARCHAR2(50) | Resource Identifier, may be a foreign key from SDP_USR_T |
| SUBID | NUMBER(20) | Subscription Identifier, may be a foreign key from SDP_SUB_T |
| STATUS | VARCHAR2(20) | Service Activation Status |

TABLE 24

Application Service Catalog Table

| SDP_SVC_T | APPLICATION SERVICE CATALOG | |
|---|---|---|
| FIELD | TYPE | DESCRIPTION |
| SVCCODE | VARCHAR2(20) | Service Code, may be a primary key |
| SVCNAME | VARCHAR2(50) | Service Name |
| SVCTYPE | VARCHAR2(20) | Service Type |
| SVCSTATUS | VARCHAR2(20) | Service Status |

TABLE 25

Application Service Parameter Table

| SDP_SVC_SPEC_T | APPLICATION SERVICE PARAM | |
|---|---|---|
| FIELD | TYPE | DESCRIPTION |
| SVCCODE | VARCHAR2(20) | Service Code, may be a primary key and/or a foreign key from SDP_SVC_T |
| APPSERVICEPARAMNAME | VARCHAR2(50) | Application Service Param Name, may be a primary key |
| APPSERVICEPARAMTYPE | VARCHAR2(50) | Application Service Param Type |

TABLE 26

Application Service Data Table

| SDP_USR_SVC_PROP_T | APPLICATION SERVICE DATA | |
| --- | --- | --- |
| FIELD | TYPE | DESCRIPTION |
| USRSVCID | NUMBER(20) | User - Service Combination Identifier, may be a primary key and/or a foreign key from SDP_USR_SVC_T |
| APPSERVICEPARAMNAME | VARCHAR2(50) | Application Service Parameter Name, may be a primary key |
| APPSERVICEDATA | VARCHAR2(50) | Application Service Data |

TABLE 27

Network Service Instance Table

| SDP_CUST_NET_SVC_T | NETWORK SERVICE INSTANCE | |
| --- | --- | --- |
| FIELD | TYPE | DESCRIPTION |
| CUSTNETSVCID | NUMBER(20) | User Network Service Combination Identifier, may be a primary key. This field identifiers a unique association between a customer and a network service and may qualify the subscription (as a foreign key) to the service. |
| CUSTID | NUMBER(20) | Customer Identifier, may be a foreign key from SDP_CUST_T |
| NETSVCCODE | VARCHAR2(20) | Network Service Code, may be a foreign key from SDP_NET_SVC_T |
| ACCESSSERVERID | VARCHAR2(50) | |
| ACCESSSERVERIP | VARCHAR2(15) | |
| SLOT | NUMBER(3) | |
| PORT | NUMBER(3) | |
| INTERFACE | NUMBER(20) | |
| VCI | NUMBER(5) | |
| VPI | NUMBER(5) | |
| MAXAVAILBAND | NUMBER(5) | Provides an identifier of a maximum available bandwidth for the network service. |
| GUARBAND | NUMBER(5) | Provides an identifier of the guaranteed bandwidth for the network service. |
| COS | NUMBER(5) | Provides an identifier of a class of service, such as 'Gold' or 'Silver' indicators of bandwidth or other service characteristics. |

TABLE 28

Network Service Catalog Table

| SDP_NET_SVC_T | NETWORK SERVICE CATALOGUE | |
| --- | --- | --- |
| FIELD | TYPE | DESCRIPTION |
| NETSERVICECODE | VARCHAR2(20) | Network Service Code (i.e., NETSVCCODE), may be a primary key which provides a unique identifier of a network service in the catalogue. |
| NETSERVICENAME | VARCHAR2(50) | Network Service Name |
| NETSERVICETYPE | VARCHAR2(20) | Network Service Type |
| NETSERVICESTATUS | VARCHAR2(20) | Network Service Status |

TABLE 29

Network Service Parameter Table

SDP_NET_SVC_SPEC_T          NETWORK SERVICE PARAM

| FIELD | TYPE | DESCRIPTION |
|---|---|---|
| NETSERVICECODE | VARCHAR2(20) | Network Service Code, may be a primary key and/or a foreign key from SDP_NET_SVC_T |
| NETSERVICEPARAMNAME | VARCHAR2(50) | Network Service Param Name, may be a primary key |
| NETSERVICEPARAMTYPE | VARCHAR2(50) | Network Service Param Type |

TABLE 30

Network Service Data Table

SDP_NET_SVC_PROP_T          NETWORK SERVICE DATA

| FIELD | TYPE | DESCRIPTION |
|---|---|---|
| CUSTNETSVCID | NUMBER(20) | Customer Network Service Combination Identifier, may be a primary key and/or a foreign key from SDP_CUST_NET_SVC_T |
| NETSERVICEPARAMNAME | VARCHAR2(50) | Network Service Param Name, may be a primary key |
| NETSERVICEDATA | VARCHAR2(50) | Network Service Data |

Tables 31 and 32 below provide an example implementation of the presence layer 1110.

TABLE 31

Network Service Presence Table

SDP_NET_PRES_T          NETWORK SERVICE PRESENCE

| FIELD | TYPE | DESCRIPTION |
|---|---|---|
| USRID | VARCHAR2(50) | Username@Domain, may be a primary key |
| CUSTNETSVCID | NUMBER(20) | Customer Network Service Combination Identifier, may be a foreign key from SDP_CUST_NET_SVC_T. This field provides a unique identifier of an association between a customer and a network service, and may qualify a subscription to a service. |
| IDENTITY | VARCHAR2(50) | Alias Identity |
| IP | VARCHAR2(50) | IP Address |
| ACCESSSERVERIP | VARCHAR2(50) | Access Server IP |
| ACCESSSERVERID | VARCHAR2(15) | Access Server ID |
| MAXAVAILBAND | NUMBER(5) | Max Available Band |
| GUARBAND | NUMBER(5) | Guaranteed Band |
| NETSERVICECODE | VARCHAR2(20) | Network Service Code |
| TIMESTAMP | DATE | Timestamp |

TABLE 32

Application Service Presence Table

SDP_SVC_PRES_T          APPLICATION SERVICE PRESENCE

| FIELD | TYPE | DESCRIPTION |
|---|---|---|
| USRSVCID | NUMBER(20) | User - Service Combination Identifier, may be a primary key and/or a foreign key from SDP_USR_SVC_T |

TABLE 32-continued

Application Service Presence Table

SDP_SVC_PRES_T      APPLICATION SERVICE PRESENCE

| FIELD | TYPE | DESCRIPTION |
|---|---|---|
| USRID | VARCHAR2(50) | Username@Domain, may be a primary key and/or a foreign key from SDP_USR_T |
| IDENTITY | VARCHAR2(50) | Alias Identity |
| PORT | NUMBER(20) | Port |
| CONTACTIP | VARCHAR2(50) | IP Address |
| EXPIRY | NUMBER(20) | Expiry Time |
| DISPLAYNAME | VARCHAR2(100) | Display Name |
| STATUS | VARCHAR2(20) | Status |
| SVCCODE | VARCHAR2(50) | Service Code |
| TIMESTAMP | DATE | Timestamp |

The network service instance table 1122 instantiates network services subscribed by the users. There may exist a one to many relationship to the network service presence table 1136. Thus, the data model 1100 provides tracking capability for multiple sets of presence information for the same network resource (e.g., multiple PPP sessions on the same DSL modem). Similarly, the application service instance table 1130 instantiates application services subscribed by the users. There may exist a one to many relationship to the application service presence table 1138. Thus, the data model 1100 provides tracking capability for multiple sets of presence information for the same user and application resource.

Figure 12:
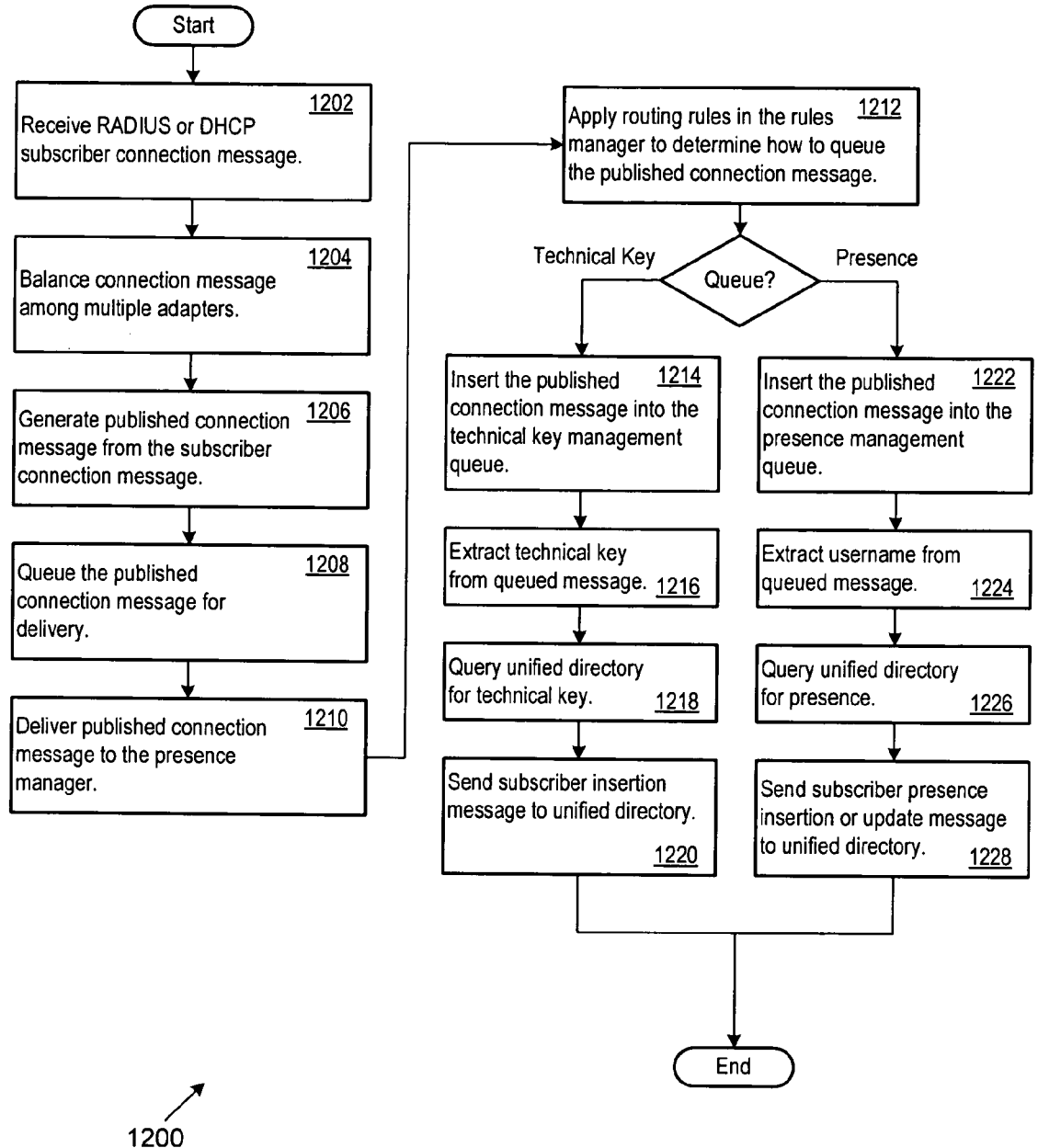
FIG. 12 shows acts which the presence system may take to process subscriber connection messages.

FIG. 12 shows acts 1200 which the presence system 202 may take to process subscriber connection messages. The presence system 202 receives, as examples, a RADIUS or DHCP message (Act 1202). A load balancer in the presence system 202 may distribute incoming messages between multiple message publishers 304 to balance the message processing load and increase performance (Act 1204).

The message publishers 304 generate connection messages according to a common format and publish the messages (Act 1206). Thus, the message queue manager 306 receives and queues the published connection messages 325 (Act 1208). The message queue manager 306 delivers the published connection messages to message subscribers, such as the presence manager 308 (Act 1210).

The message publisher/subscriber 328 in the presence manager 308 receives the published connection messages. The rules manager 330 may then apply the routing rules 332 to determine how to queue the received connection message for further processing (Act 1212). For example, the rules manager 330 may determine whether to queue the connection message in a technical key management queue 336 or a presence management queue 334.

The technical key management queue 336 and TK queue logic 340 authenticate subscriber connection requests. Such requests may arise from RADIUS authentication or DHCP discover messages, as examples. If the subscriber is authenticated, the TK queue logic 340 inserts the subscriber information into the unified directory system 204. Subsequent messages processed through the presence management queue 334 may then give rise to subscriber information updates in the unified directory, such as IP address information updates.

As described above, certain messages may be inserted into the technical key management queue 336 (Act 1214). The technical key queue logic 340 extracts messages from the queue 336 (Act 1216). The technical key queue logic 340 processes the messages according to the technical key queue logic processing rules, such as those shown in Table 16. For example, the technical key queue logic 340 queries the unified directory 204 for a subscriber matching the technical key provided in the published connection message (Act 1218). If a matching subscriber technical key is not found, then the presence system 202 sends a subscriber insertion message to the unified directory system 204.

The subscriber insertion message may request the unified directory system 204 to insert a subscriber identifier (e.g., a username or other subscriber identifier), a network service instance identifier (e.g., CUSTNETSVCID) which provides a unique identifier of an association between a customer and a network service, or other subscriber profile information into the subscriber profile data store which the unified directory system 204 maintains. The unified directory system 204 may insert the subscriber profile information into the network service presence table 1136. As a result, the presence system 202 keeps the unified directory system 204 up to date with respect to subscriber connection activity. The unified directory system 204 may thereby response to subscriber profile queries with current information about the subscriber.

As another example, certain messages may be inserted into the presence management queue 334 (Act 1222). The presence queue logic 338 extracts messages from the presence management queue 336 (Act 1224) for processing. The presence queue logic 338 may query the unified directory 204 to determine whether a matching USRID and network service instance identifier are already present in the network service presence table 1136 (Act 1226).

If so, the presences system 202 sends a subscriber update message to the unified directory system 204. The subscriber update message instructs the unified directory system 204 to update the network service presence table 1136 with the current subscriber IP address provided in the published subscriber connection message. If a matching USRID and network service instance identifier are not already present, then the presence system 202 sends a subscriber presence insertion message to the unified directory system 204. The subscriber presence insertion message may instruct the unified directory system 204 to insert a subscriber identifier (e.g., a username or other subscriber identifier), a network service instance identifier, a current subscriber IP address (provided in the published connection message) or other subscriber profile information into the subscriber profile data store which the unified directory system 204 maintains. Thus, the presence system 202 updates changing or additional subscriber connection information in the unified directory system 204, and also ensures that active subscribers are noted in the presence information maintained in the network service presence table.

Figure 13:
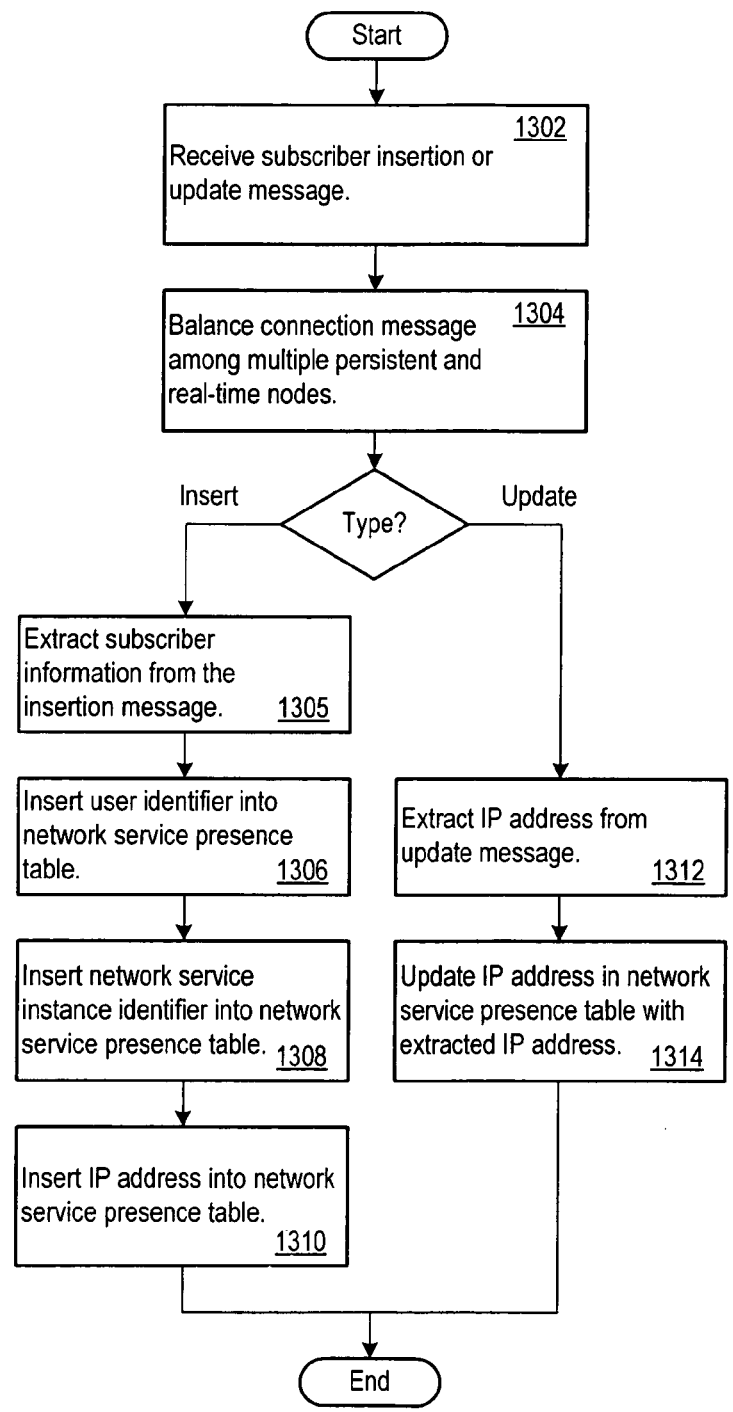
FIG. 13 shows acts which the unified directory system may take to process subscriber insertion or subscriber update messages.

FIG. 13 shows acts 1300 which the unified directory system 204 may take to process subscriber insertion or subscriber update messages. The unified directory system 204 receives the subscriber insertion and update messages (Act 1302). A load balancer 1012 may distribute the subscriber insertion and update messages among the persistent nodes 1020-1022 to balance the load and improve performance (Act 1304).

For subscriber insertion messages, the unified directory system 204 inserts the requested subscriber information into the network service presence table 1136. The unified directory system 204 extracts the requested subscriber information from the insertion message (Act 1305). For example, the subscriber insertion message may instruct the unified directory system 204 to insert a subscriber identifier such as a username (Act 1306). As another example, the subscriber insertion message may instruct the unified directory system 204 to insert a network service instance identifier (Act 1308). As yet another example, the subscriber insertion message may instruct the unified directory system 204 to insert the subscriber IP address into the network service presence table 1136 (Act 1310).

The unified directory system 204 may also process subscriber update messages. To that end, the unified directory system 204 may extract an updated subscriber IP address from the update message (Act 1312). The unified directory system 204 may then update the IP address in the network service presence table 1136 with the extracted IP address (Act 1314).

Figure 14:
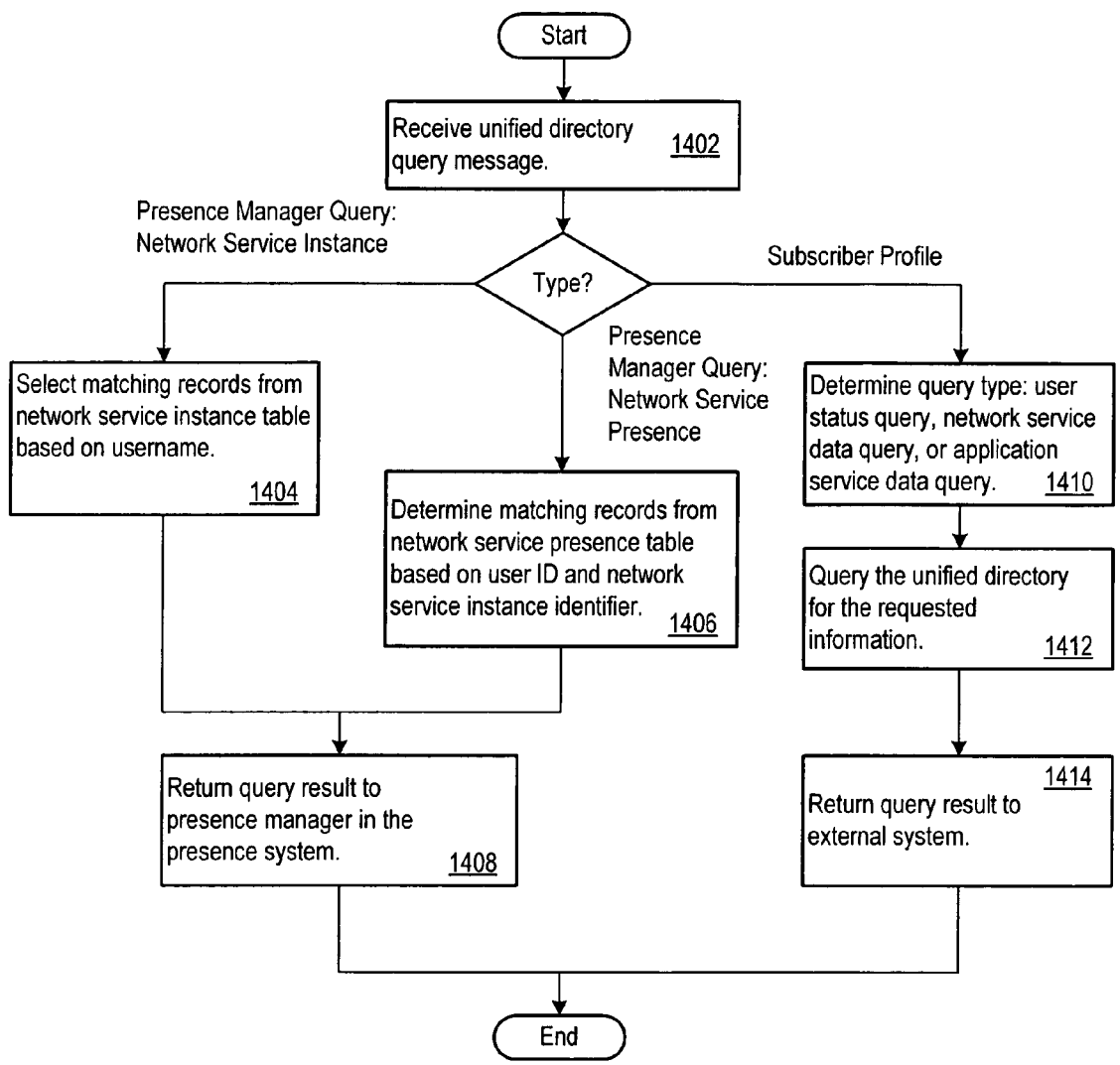
FIG. 14 shows acts which the unified directory system may take to process subscribe profile queries from the presence system and from external systems.

FIG. 14 shows acts 1400 which the unified directory system 204 may take to process unified directory queries from the presence system 202 and from external systems 1006, such as the service broker 116, third party access gateway 110, and other external systems. The unified directory system 204 receives the query message (Act 1402). The query message may take many different forms. As examples, the query message may be a network service instance query or a network service presence query from the presence system 202. As additional examples, the query message may be a user status query, network service data query, or application service data query received from an external system.

The presence manager 202 sends a query to the unified directory system 204 when attempting to find a matching customer ID (as noted above in Tables 16 and 17). The unified directory system 204 may respond by searching the data access layer 1010 for matching records from the network service instance table based on the CUSTID which matches the username provided in the published subscriber connection message (Act 1404) and which is established in the user table. A search query results.

Additionally, the presence manager 202 may send a query of the network service presence table 1136 when attempting to determine if a matching subscriber has been established in the network service presence table 1136 (as noted above in Tables 16 and 17). The unified directory system 204 may respond by searching the data access layer 1010 for matching records from the network service presence bale 1136 based on a username and network service instance identifier. A search query results. For either type of query message from the presence system 202, the unified directory system 204 returns the search query result to the presence manager 308 through the presence interface 210 (Act 1408).

External systems may query the unified directory system 204 for subscriber profile information through the external interface 212. For example, the external systems may send a user status query, a network service data query, an application service data query, or another type of query. The unified directory system 204 determines the type of query based on message content (Act 1410), such as a message label field (e.g., TSOLABEL in the messages shown below). The unified directory system 204 queries the data access layer 1010 for the requested information (Act 1412). A search query results and is returned to the external system (Act 1414).

Table 33 provides an example of a user status query message. The unified directory system 204 may search for subscribers which match each of the attributes in the message, and return the subscriber profile information for each matching subscriber. The SVC_PROP_T tables establish application service parameter names and store associated parameter data values for subscribed network and application services. In the example in Table 33, user status is queried with respect to an application service ("bac0010001") matching an application service parameter named "CATEGORYID" with a value of "C01". The SERVICEID field may be matched against the service code (e.g., SVCCODE) in the SVC_T tables.

The profile information may include presence information which indicates whether the subscriber is online or offline, for example. Table 34 provides an example of a user status query response which delivers the search query results to the external system.

TABLE 33

User status query message

| Field | Description |
|---|---|
| TSOID | A unique identifier of the message |
| TSOLABEL | An identifier of the message type, e.g., GETUSERSTATUS |
| Attribute Name | An identifier of a subscriber attribute or service parameter, e.g., a category of user (CATEGORYID) |
| Attribute Name | An identifier of a subscriber attribute, e.g., a user ID (USERID) |
| Attribute Name | An identifier of a subscriber attribute, e.g., a service identifier (SERVICEID) |

Example XML user status query message

```
<?xml version="1.0" encoding="ISO-8859-1" ?>
  <TSO_DATA xmlns:xsi="http://www.w3.org/2001/XMLSchema-
  instance"
xsi:noNamespaceSchemaLocation="F:\tmp \TSOSchema_3PGW.xsd">
  <TSOheader TSOID="12345" TSOlabel="GETUSERSSTATUS" />
    <TSOattributes>
      <attribute name="CATEGORYID" value="C01" />
      <attribute name="USERID" value=" " />
      <attribute name="SERVICEID" value="bac0010001" />
    </TSOattributes>
  </TSO_DATA>
```

TABLE 34

User status query response

| Field | Description |
|---|---|
| TSOID | A unique identifier of the message |
| TSOLABEL | An identifier of the message type, e.g., GETUSERSTATUS |
| User ID List | A list of matching User IDs |
| User Status List | A list giving the user status for each matching User ID |
| TSOResult | A result status code, error code, and error description |

Example XML user status query response message

```
<?xml version="1.0" encoding="ISO-8859-1" ?>
  <TSO_DATA xmlns:xsi="http://www.w3.org/2001/XMLSchema-
  instance"
xsi:noNamespaceSchemaLocation="F:\tmp\TSOSchema_3PGW.xsd">
  <TSOheader TSOID="12345" TSOlabel="GETUSERSSTATUS" />
    <TSOattributes>
      <list name="USERSID" value="3">
        <attribute name="1" value="grant@mail" />
        <attribute name="2" value="bob@mail" />
        <attribute name="3" value="deb@mail" />
      </list>
      <list name="USERSSTATUS" value="3">
        <attribute name="1" value="ONLINE" />
        <attribute name="2" value="OFFLINE" />
```

TABLE 34-continued

```
      <attribute name="3" value="ONLINE" />
    </list>
  </TSOattributes>
  <TSOresult>
    <statusCode>0</statusCode>
    <errorCode></errorCode>
    <errorDescription></errorDescription>
  </TSOresult>
</TSO_DATA>
```

Table 35 provides an example of a network service data query message. The unified directory system 204 may search the network service profile tables 1120-1126, and return network profile information for each matching network service. The network profile information may include the subscriber's account ID, network status, location, access type, or other profile information. Table 36 provides an example of a network service query response which delivers the search query results to the external system.

TABLE 35

Network service data query message

| Field | Description |
| --- | --- |
| TSOID | A unique identifier of the message |
| TSOLABEL | An identifier of the message type, e.g., GETNETWORKSERVICEDATA |
| Attribute Name | An identifier of an attribute of a network service, e.g., a Mobile Station Integrated Services Digital Network (MSISDN) identifier for a mobile phone, or an IP Address for a IPTV connection. |

Example XML network service data query message

```
<?xml version="1.0" encoding="ISO-8859-1" ?>
  <TSO_DATA xmlns:xsi="http://www.w3.org/2001/XMLSchema-
instance"
xsi:noNamespaceSchemaLocation="F:\tmp\TSOSchema_3PGW.xsd">
    <TSOheader TSOID="12345"
TSOlabel="GETNETWORKSERVICEDATA" />
      <TSOattributes>
        <attribute name="IPADDRESS" value="80.17.10.23" />
      </TSOattributes>
    </TSO_DATA>
```

TABLE 36

Network service data query response message

| Field | Description |
| --- | --- |
| TSOID | A unique identifier of the message |
| TSOLABEL | An identifier of the message type, e.g., GETNETWORKSERVICEDATA |
| Attribute Name | An identifier of a network service attribute, e.g., an account identifier (ACCOUNTID) |
| Attribute Name | An identifier of a network service attribute, e.g., a network status identifier (NETSTATUS) |
| Attribute Name | An identifier of a network service attribute, e.g., a location name (LOCATION) |
| Attribute Name | An identifier of a network service attribute, e.g., a type or characteristic of access, such as speed (TYPEOFACCESS) |
| TSOResult | A result status code, error code, and error description |

Example XML network service data query response message

```
<?xml version="1.0" encoding="ISO-8859-1" ?>
  <TSO_DATA xmlns:xsi="http://www.w3.org/2001/XMLSchema-
instance"
xsi:noNamespaceSchemaLocation=
"F:\tmp\UK\TSOSchema_3PGW.xsd">
    <TSOheader TSOID="12345"
```

TABLE 36-continued

```
TSOlabel="GETNETWORKSERVICEDATA" />
  <TSOattributes>
    <attribute name="ACCOUNTID" value="0687180081" />
    <attribute name="NETSTATUS" value="OK" />
    <attribute name="LOCATION" value="Rome" />
    <attribute name="TYPEOFACCESS" value="MEGA" />
  </TSOattributes>
</TSO_DATA>
```

Table 37 provides an example of an application service data query message. The unified directory system 204 may search the application tables 1128-1134 for applications which match each of the attributes in the message, and return application service profile information for each matching application. The application service profile information may include technical profile information for the service, such as account ID, subscriber first name and last name, billing city, billing address, plan ID, customer type, or other profile information. Table 38 provides an example of a network service query response which delivers the search query results to the external system.

TABLE 37

Application service data query message

| Field | Description |
| --- | --- |
| TSOID | A unique identifier of the message |
| TSOLABEL | An identifier of the message type, e.g., GETAPPLICATIONSERVICEDATA |
| Attribute Name | One or more identifiers of attributes of an application service, e.g., a Mobile Station Integrated Services Digital Network (MSISDN) identifier for a mobile phone, a service identifier, and/or an IP Address when the subscriber interacts directly with an application such as an IPTV application. |

Example XML application service data query message

```
<?xml version="1.0" encoding="ISO-8859-1" ?>
  <TSO_DATA xmlns:xsi="http://www.w3.org/2001/XMLSchema-
instance"
xsi:noNamespaceSchemaLocation=
"F:\tmp\TSOSchema_3PGW.xsd">
    <TSOheader TSOID="12345"
TSOlabel="GETAPPLICATIONSERVICEDATA" />
      <TSOattributes>
        <attribute name="IPADDRESS" value="77.17.10.23" />
        <attribute name="SERVICEID" value="bac0014001" />
      </TSOattributes>
    </TSO_DATA>
```

TABLE 38

Application service data query response message

| Field | Description |
| --- | --- |
| TSOID | A unique identifier of the message |
| TSOLABEL | An identifier of the message type, e.g., GETAPPLICATIONSERVICEDATA |
| Attribute Name | A flag which begins a list of technical application service information |
| List Name | A flag which begins a list of technical application service information |
| Attribute Names | One or more identifiers of an application service attribute, e.g., an account identifier, subscriber first name, last name, the street address where a bill is sent, the region (e.g., province) where a bill is sent, a postal code for the address where the bill is sent, and a county where the bill is sent. |
| TSOResult | A result status code, error code, and error description |

TABLE 38-continued

Example XML application service data query response message for IPTV application service

```
<?xml version="1.0" encoding="ISO-8859-1" ?>
    <TSO_DATA xmlns:xsi=
    "http://www.w3.org/2001/XMLSchema-instance"
xsi:noNamespaceSchemaLocation="F:\tmp\TSOSchema_3PGW.xsd">
    <TSOheader TSOID="12345" TSOlabel=
    "GETAPPLICATIONSERVICEDATA" />
        <TSOattributes>
        <attribute name="SERVICESTATUS" value="OK" />
        <list name="SERVICETECHNICALPROFILE">
            <attribute name="ACCOUNTID" value="0687180081" />
            <attribute name="ACCFIRSTNAME" value="Gordon" />
            <attribute name="ACCLASTNAME" value="Freeman" />
            <attribute name="ACCBILLCITY" value="City" />
            <attribute name="ACCBILLADDRESS1" value="Lambda Street" />
            <attribute name="ACCBILLREGION" value="Region1" />
            <attribute name="ACCBILLPOSTALCODE" value="00100" />
            <attribute name="ACCBILLCOUNTRY" value="Country1" />
        </list>
        </TSOattributes>
    </TSO_DATA>
```

Example XML application service data query response message for mobile phone application service

```
<?xml version="1.0" encoding="ISO-8859-1" ?>
    <TSO_DATA xmlns:xsi=
    "http://www.w3.org/2001/XMLSchema-instance"
xsi:noNamespaceSchemaLocation="F:\tmp\TSOSchema_3PGW.xsd">
    <TSOheader TSOID="12345" TSOlabel=
    "GETAPPLICATIONSERVICEDATA" />
        <TSOattributes>
        <attribute name="SERVICESTATUS" value="OK" />
<list name="SERVICETECHNICALPROFILE">
            <attribute name="COUNTRYCODE" value="0039" />
            <attribute name="ROAMINGSTATUS" value="StatusA" />
            <attribute name="ACCESSCHANNEL" value="Ch3" />
            <attribute name="ROAMINGPARTNER" value="H3G" />
            <attribute name="CUSTOMERTYPE" value="Business" />
            <attribute name="PLANID" value="Plan005" />
            <attribute name="SIMTYPE" value="PREPAID" />
            <attribute name="TERMINALMODE" value="DUAL" />
            <attribute name="MMSSTATUS" value="OK" />
            <attribute name="UMTSSTATUS" value="OK" />
            <attribute name="GPRSSTATUS" value="OK" />
        </list>
        </TSOattributes>
    </TSO_DATA>
```

Table 39 provides an example of a user profile query message. The unified directory system 204 may search the subscriber profile data store for the matching user profile information, and return the profile information to the external system. Table 40 provides an example of a user profile query response which delivers the search query results to the external system.

TABLE 39

User profile query message

| Field | Description |
|---|---|
| TSOID | A unique identifier of the message |
| TSOLABEL | An identifier of the message type, e.g., GETUSERPROFILE |
| Attribute Name | An identifier of an attribute of a network service, e.g., a Mobile Station Integrated Services Digital Network (MSISDN) identifier for a mobile phone, or an IP Address for a IPTV connection. |

Example XML user profile query message

```
<?xml version="1.0" encoding="ISO-8859-1" ?>
    <TSO_DATA xmlns:xsi=
```

TABLE 39-continued

```
    "http://www.w3.org/2001/XMLSchema-instance"
xsi:noNamespaceSchemaLocation="F:\tmp\TSOSchema_3PGW.xsd">
    <TSOheader TSOID="12345" TSOlabel="GETUSERPROFILE" />
        <TSOattributes>
        <attribute name="IPADDRESS" value="80.17.10.23" />
        </TSOattributes>
    </TSO_DATA>
```

TABLE 40

User profile query response message

| Field | Description |
|---|---|
| TSOID | A unique identifier of the message |
| TSOLABEL | An identifier of the message type, e.g., GETUSERPROFILE |
| Attribute Name | An identifier of a network service attribute, e.g., an account identifier (ACCOUNTID) |
| Attribute Name | An identifier of a network service attribute, e.g., a network status identifier (NETSTATUS) |
| Attribute Name | An identifier of a network service attribute, e.g., a location name (LOCATION) |
| Attribute Name | An identifier of a network service attribute, e.g., a type or characteristic of access, such as speed (TYPEOFACCESS) |
| TSOResult | A result status code, error code, and error description |

Example XML user profile query response message

```
<?xml version="1.0" encoding="ISO-8859-1" ?>
    <TSO_DATA xmlns:xsi=
    "http://www.w3.org/2001/XMLSchema-instance"
xsi:noNamespaceSchemaLocation="F:\tmp\UK\
TSOSchema_3PGW.xsd">
    <TSOheader TSOID="12345" TSOlabel="GETUSERPROFILE" />
        <TSOattributes>
        <attribute name="ACCOUNTID" value="testemail@test.com" />
        <attribute name="NETSTATUS" value="OK" />
        <attribute name="LOCATION" value="Rome" />
        <attribute name="TYPEOFACCESS" value="MEGA" />
        </TSOattributes>
    </TSO_DATA>
```

Table 41 provides an example of a service profile query message, which returns information concerning the status of the service identified in the query message. Table 40 provides an example of a user profile query response which delivers the query results to the external system.

TABLE 41

Service profile query message

| Field | Description |
|---|---|
| TSOID | A unique identifier of the message |
| TSOLABEL | An identifier of the message type, e.g., GETSERVICEPROFILE |
| Attribute Name | An identifier of an attribute of a network service, e.g., an IP Address for a IPTV connection, and a Service ID. |

Example XML service profile query message

```
<?xml version="1.0" encoding="ISO-8859-1" ?>
    <TSO_DATA xmlns:xsi=
    "http://www.w3.org/2001/XMLSchema-instance"
xsi:noNamespaceSchemaLocation="F:\tmp\TSOSchema_3PGW.xsd">
    <TSOheader TSOID="12345" TSOlabel=
    "GETSERVICEPROFILE" />
        <TSOattributes>
        <attribute name="IPADDRESS" value="80.17.10.23" />
        <attribute name="SERVICEID" value="ar0203030202" />
        </TSOattributes>
    </TSO_DATA>
```

TABLE 40

Service profile query response message

| Field | Description |
| --- | --- |
| TSOID | A unique identifier of the message |
| TSOLABEL | An identifier of the message type, e.g., GETSERVICEPROFILE |
| Attribute Name | An identifier of a status of the service (SERVICESTATUS) |
| Attribute Name | An identifier of data associated with the service (e.g., an email account address) (SERVICEDATA) |
| TSOResult | A result status code, error code, and error description |

Example XML service profile query response message

```
<?xml version="1.0" encoding="ISO-8859-1" ?>
  <TSO_DATA xmlns:xsi=
  "http://www.w3.org/2001/XMLSchema-instance"
xsi:noNamespaceSchemaLocation=
"F:\tmp\UK\TSOSchema_3PGW.xsd">
  <TSOheader
    TSOID="12345" TSOlabel="GETSERVICEPROFILE" />
    <TSOattributes>
    <attribute name="SERVICESTATUS" value="ok" />
    <attribute name="SERVICEDATA" value="e.jarvis@sb.com" />
    </TSOattributes>
  </TSO_DATA>
```

The subscriber profile access management system 122 provides technical solutions to the problems of extensive dispersal of subscriber profile information between many different telecommunication support systems. The interfaces to the subscriber profile access management system 122 allow the unified directory system 204 to act as the single access point to subscriber profile information. The presence system 202, through the message publisher and presence manager, and the unified directory system 204, through the high performance multi-node data access layer, provides a technical solution to handling the profile queries, insertions, and updates for a carrier grade environment which supports hundreds of thousands to millions of subscribers.

Furthermore, the layered structure and table implementation of the data model 1100 provides a technical solution to independently tracking and managing presence information for both network services and application services. In addition, the layered structure of the data model 1100 provides a technical solution to establishing and monitoring presence information, independently, for both network services and application services. Accordingly, the subscriber profile access management system 122 effectively provides a single point of access to subscriber profile information for a carrier grade telecommunications service provider.

This application incorporates by reference the entirety of each of the following U.S. patent applications:

Unified Directory System Including a Data Model for Managing Access to Telecommunications Services, filed Dec. 13, 2005, and assigned Ser. No. 11/313,496.

Message Sequencing and Data Translation Architecture for Telecommunication Services, filed Dec. 13, 2005, and assigned Ser. No. 11/314,576.

Service Broker Integration Layer for Supporting Telecommunication Client Service Requests, filed Dec. 13, 2005, and assigned Ser. No. 11/313,497.

Authentication and Authorization Architecture for an Access Gateway, filed Dec. 13, 2005, and assigned Ser. No. 11/313,441.

Third Party Access Gateway for Telecommunications Services, filed Dec. 13, 2005, and assigned Ser. No. 11/314,577.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A subscriber profile access management system for a telecommunications service provider, the subscriber profile access management system comprising:
    a presence system comprising:
        a network data gatherer configured to receive a subscriber connection message;
        a message publisher coupled to the data gatherer configured to generate a published connection message from the subscriber connection message;
        a message queue manager configured to queue the published connection message, the published connection message comprising a message type field, a technical key comprising subscriber connection identifying information, and a subscriber identifier;
        a rules manager configured to receive the published connection message from the message queue manager, the rules manager comprising a routing rule which determines whether to forward the published connection message to a technical key management queue or a presence management queue, where the technical key management queue is configured to receive the published connection message in order to authenticate the subscriber identifier, and where the presence management queue is configured to receive the published connection message in order to update subscriber presence information; and
    a unified directory system comprising:
        a data access layer comprising:
            a persistent subscriber profile data store in a first memory;
            a cached representation of the persistent subscriber profile data store in a second memory which is faster than the first memory, the persistent subscriber profile data store comprising a network service presence table;
            multiple parallel persistent hardware nodes which store the persistent subscriber profile data store and at least one copy of the persistent subscriber profile data store; and
            multiple parallel real-time hardware nodes which store the cached representation of the persistent subscriber profile data store and at least one copy of the cached representation of the persistent subscriber profile data store;
        a communication interface to the presence system configured to receive a subscriber insertion submission from the presence system in response to the published connection message; and
        service logic operable to insert a subscriber identifier into the network service presence table in the data access layer in response to the subscriber insertion submission.

2. The subscriber profile access management system of claim 1, where the message publisher is configured to generate the published connection message according to a common message format for published connection messages.

3. The subscriber profile access management system of claim 1, where the subscriber identifier comprises a username.

4. The subscriber profile access management system of claim 1, where unified directory system further comprises a hypertext transport protocol (HTTP) interface configured to receive a subscriber profile query from an external system.

5. The subscriber profile access management system of claim 4, where the subscriber profile query comprises a user status query, a network service data query, or an application service data query.

6. The subscriber profile access management system of claim 1, where the technical key comprises an access server internet protocol address field, access server identifier field, slot identifier field, port identifier field, interface identifier field, virtual path identifier field, and a virtual connection identifier field.

7. The subscriber profile access management system of claim 1, where the subscriber connection message comprises a dynamic host configuration protocol (DHCP) message.

8. The subscriber profile access management system of claim 1, where the subscriber connection message comprises a remote authentication dial-in user service (RADIUS) message.

9. The subscriber profile access management system of claim 1, where the service logic is further operable to insert a network service identifier into the network service presence table in the data access layer in response to the subscriber insertion submission.

10. The subscriber profile access management system of claim 1, where the communication interface is further operable to receive a subscriber presence update submission from the presence system, and where the service logic is further configured to update a network presence field in the network service presence table.

11. The subscriber profile access management system of claim 10, where the network presence field comprises a subscriber internet protocol address field.

12. A method for managing access to a subscriber profile in a telecommunications service provider architecture, the method comprising:
  receiving a subscriber connection message at a network data gatherer;
  generating a published connection message from the subscriber connection message, the published connection message comprising a message type field, a technical key comprising subscriber connection identifying information and a subscriber identifier;
  queuing the published connection message in a message queue manager;
  receiving the published connection message at a rules manager;
  applying a routing rule to the published connection message which determines whether to forward the published connection message to a technical key management queue or a presence management queue, where the technical key management queue is configured to receive the published connection message in order to authenticate the subscriber identifier, and where the presence management queue is configured to receive the published connection message in order to update subscriber presence information;
  establishing a data access layer comprising:
    a persistent subscriber profile data store in a first memory;
    a cached representation of the persistent subscriber profile data store in a second memory which is faster than the first memory;
    multiple parallel persistent hardware nodes which store the persistent subscriber profile data store and at least one copy of the persistent subscriber profile data store; and
    multiple parallel real-time hardware nodes which store the cached representation of the persistent subscriber profile data store and at least one copy of the cached representation of the persistent subscriber profile data store;
  establishing a network service presence table in the persistent subscriber profile data store;
  receiving a subscriber insertion submission through a communication interface to a presence system in response to receipt of the published connection message; and
  inserting a subscriber identifier into the network service presence table in the data access layer in response to the subscriber insertion submission.

13. The method of claim 12, where generating comprises:
  generating the published connection message according to a common message format for published connection messages.

14. The method of claim 12, where the subscriber identifier comprises a username.

15. The method of claim 12, further comprising:
  receiving a subscriber profile query comprising a user status query, a network service data query, or an application service data query from an external system;
  querying the data access layer in response to the subscriber profile query to obtain a query result; and
  returning the query result to the external system.

16. The method of claim 14, where the technical key comprises an access server internet protocol address field, access server identifier field, slot identifier field, port identifier field, interface identifier field, virtual path identifier field, and a virtual connection identifier field.

17. The method of claim 12, where the subscriber connection message comprises a dynamic host configuration protocol (DHCP) message.

18. The method of claim 12, where the subscriber connection message comprises a remote authentication dial-in user service (RADIUS) message.

19. The method of claim 12, further comprising inserting a network service identifier into the network service presence table in the data access layer in response to the subscriber insertion submission.

20. The method of claim 12, further comprising:
  receiving a subscriber presence update submission from the presence system;
  and updating a network presence field in the network service presence table.

21. The method of claim 20, where the network presence field is a subscriber internet protocol address field.

22. A presence system for a subscriber profile access management system, the presence system comprising:
  a memory coupled to a processor;
  a network data gatherer configured to receive a subscriber connection message;
  a message publisher coupled to the data gatherer configured to generate a published connection message from the subscriber connection message, where the published connection message comprises a technical key which identifies a subscriber connection and a message type field and adheres to a single format defined for published connection messages in the presence system, and where the subscriber connection message comprises a RADIUS connection message or a DHCP connection message;
  a message queue manager configured to queue the published connection message;
  a rules manager configured to receive the published connection message from the message queue manager, the rules manager comprising a routing rule which determines whether to forward the published connection message to a technical key management queue or a presence management queue;

technical key queue logic, executed by the processor, configured to process the technical key management queue and responsively authenticates a subscriber; and presence queue logic, executed by the processor, configured to process the presence management queue and responsively issues a subscriber presence update comprising an alias identifier update.

23. The presence system of claim 22, where the message type field comprises a command code which encodes a message type of the subscriber connection message.

24. The presence system of claim 23, where the message type field specifies that the published connection message comprises an access-request or accounting-request message.

25. The presence system of claim 23, where the message type field specifies that the published connection message comprises a DHCPDISCOVER, DHCPNAK, or DHCPACK message.

26. The presence system of claim 23, where at least one of the technical key queue logic and presence queue logic comprises service logic, executed by the processor, which implements a communication interface to a unified directory system.

27. The presence system of claim 22, where the technical key comprises an access server IP address, a slot identifier and a port identifier.

28. The presence system of claim 22, where the subscriber presence update comprises a subscriber network address update.

* * * * *

UNITED STATES PATENT AND TRADEMARK OFFICE
CERTIFICATE OF CORRECTION

PATENT NO. : 7,702,753 B2  
APPLICATION NO. : 11/313463  
DATED : April 20, 2010  
INVENTOR(S) : Alberto Simongini et al.

It is certified that error appears in the above-identified patent and that said Letters Patent is hereby corrected as shown below:

On the Title Page, item (56)

Page 2, right column, line 4, after "Delivering" replace "Searmless" with --Seamless--.

Page 2, right column, line 65, after "QUATIC" replace "Proceeeings" with --Proceedings--.

Page 3, left column, line 62, before "heterogeneous content" replace "knowedgebase," with --knowledgebase,--.

In the Specification

In column 15, TABLE 15, line 6, after "insert published" replace "conncction" with --connection--.

In column 25, TABLE 27, third column, third line 3 under "DESCRIPTION", before "a unique association" replace "identifiers" with --identifies--.

In column 35, TABLE 38, about line 14, replace "name="ACCLASTNAME value" with --name="ACCLASTNAME" value--.

In column 37, line 1, replace "TABLE 40" with --TABLE 42--.

In column 37, Table 42, about line 20, replace "Schema.....3PGW" with --Schema_3PGW--.

In column 37, about line 23, replace "value="ok"/>" with --value="OK"/>--.

Signed and Sealed this  
Second Day of August, 2011

David J. Kappos  
*Director of the United States Patent and Trademark Office*